United States Patent
Chin et al.

(10) Patent No.: US 12,219,633 B2
(45) Date of Patent: Feb. 4, 2025

(54) METHOD OF TRIGGERING PACKET DATA CONVERGENCE PROTOCOL STATUS REPORT AND RELATED DEVICE

(71) Applicant: SHARP KABUSHIKI KAISHA, Sakai (JP)

(72) Inventors: Heng-Li Chin, Taipei (TW); Hung-Chen Chen, Taipei (TW); Chia-Hung Wei, Taipei (TW); Yung-Lan Tseng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 317 days.

(21) Appl. No.: 17/704,389

(22) Filed: Mar. 25, 2022

(65) Prior Publication Data

US 2022/0312525 A1    Sep. 29, 2022

Related U.S. Application Data

(60) Provisional application No. 63/166,124, filed on Mar. 25, 2021.

(51) Int. Cl.
| | |
|---|---|
| *H04W 76/15* | (2018.01) |
| *H04W 4/06* | (2009.01) |
| *H04W 24/10* | (2009.01) |
| *H04W 28/06* | (2009.01) |
| *H04W 80/02* | (2009.01) |

(52) U.S. Cl.
CPC ............ *H04W 76/15* (2018.02); *H04W 24/10* (2013.01); *H04W 28/06* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 11,425,614 B2 * | 8/2022 | You | H04W 74/0833 |
| 11,765,555 B1 * | 9/2023 | Babaei | H04W 80/04 |
| | | | 370/312 |

(Continued)

FOREIGN PATENT DOCUMENTS

CN       111901766       11/2020

OTHER PUBLICATIONS

Spreadtrum Communications, Discussion on dynamic PTM PTP switch, 3GPP TSG-RAN WG2 Meeting #113 electronic, Online, Jan. 25-Feb. 5, 2021, R2-2100677, section 2.

(Continued)

*Primary Examiner* — Duc T Duong
(74) *Attorney, Agent, or Firm* — ScienBiziP, P.C.

(57) ABSTRACT

A method of triggering a packet data convergence protocol (PDCP) status report performed by a user equipment (UE) is provided. The method includes receiving, from a network, a Data Radio Bearer (DRB) configuration that is associated with a first PDCP entity of the UE; receiving, from the network, a Multicast Broadcast Service Radio Bearer (MRB) configuration that is associated with a second PDCP entity of the UE; triggering, by the first PDCP entity, a first PDCP status report based on a first configuration of the first PDCP entity; and triggering, by the second PDCP entity, a second PDCP status report based on a second configuration of the second PDCP entity.

12 Claims, 6 Drawing Sheets

(56) References Cited

U.S. PATENT DOCUMENTS

| | | | | |
|---|---|---|---|---|
| 2015/0304903 | A1* | 10/2015 | Uchino | H04W 80/02 |
| | | | | 370/331 |
| 2016/0066241 | A1* | 3/2016 | Wu | H04W 76/27 |
| | | | | 370/331 |
| 2017/0230873 | A1* | 8/2017 | Baek | H04W 36/1443 |
| 2018/0139030 | A1* | 5/2018 | Kim | H04L 5/0053 |
| 2021/0068003 | A1 | 3/2021 | Kadiri et al. | |
| 2021/0126745 | A1* | 4/2021 | Kadiri | H04L 1/1832 |
| 2022/0217506 | A1* | 7/2022 | Xu | H04W 4/06 |
| 2022/0338291 | A1* | 10/2022 | Hong | H04W 72/30 |
| 2023/0007544 | A1* | 1/2023 | Zhu | H04W 36/0055 |
| 2023/0085168 | A1* | 3/2023 | Chen | H04W 28/0263 |
| | | | | 370/235 |
| 2023/0199437 | A1* | 6/2023 | Zhu | H04L 1/1812 |
| | | | | 370/329 |
| 2023/0262734 | A1* | 8/2023 | Qi | H04W 4/20 |
| | | | | 455/414.1 |
| 2023/0362596 | A1* | 11/2023 | Xu | H04W 76/40 |
| 2023/0396367 | A1* | 12/2023 | Hori | H04W 72/30 |
| 2024/0015849 | A1* | 1/2024 | Teyeb | H04W 76/20 |
| 2024/0015850 | A1* | 1/2024 | Fujishiro | H04W 76/40 |
| 2024/0064831 | A1* | 2/2024 | Babaei | H04L 5/0048 |
| 2024/0137826 | A1* | 4/2024 | Shimoda | H04L 1/188 |

OTHER PUBLICATIONS

CATT, Reliability Improvement for PTM Transmission, 3GPP TSG-RAN WG2 Meeting #113-e, Online, Jan. 25-Feb. 5, 2021, R2-2100083, section 2.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", V16.3.0 (Sep. 2020).

3GPP TS 38.321, "3rd Generation Partnership Project; Technical Specification Group Radio Access Network; NR; Medium Access Control (MAC) protocol specification (Release 16)", V16.3.0 (Dec. 2020).

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 16)", V16.2.0 (Sep. 2020).

3GPP TS 38.323, "3rd Generation Partnership Project; Technical Specification Group Radio Access Network; NR; Packet Data Convergence Protocol (PDCP) specification (Release 16)", V16.2.0 (Sep. 2020).

3GPP TS 38.322, "3rd Generation Partnership Project; Technical Specification Group Radio Access Network; NR; Radio Link Control (RLC) protocol specification (Release 16)", V16.2.0 (Dec. 2020).

3GPP TS 38.331, "3rd Generation Partnership Project; Technical Specification Group Radio Access Network; NR; Radio Resource Control (RRC) protocol specification (Release 16)", V16.3.1 (Jan. 2021).

3GPP TR 23.757, "3rd Generation Partnership Project; Technical Specification Group Services and System Aspects; Study on architectural enhancements for 5G multicast-broadcast services (Release 17)", V1.2.0 (Nov. 2020).

3GPP TS 36.321, "3rd Generation Partnership Project; Technical Specification Group Radio Access Network; Evolved Universal Terrestrial Radio Access (E-UTRA); Medium Access Control (MAC) protocol specification (Release 16)", V16.2.0 (Sep. 2020).

* cited by examiner

METHOD OF TRIGGERING PACKET DATA CONVERGENCE PROTOCOL STATUS REPORT AND RELATED DEVICE

CROSS-REFERENCE TO RELATED APPLICATION(S)

The present disclosure claims the benefit of and priority to U.S. Provisional Patent Application Ser. No. 63/166,124, filed on Mar. 25, 2021, entitled "METHOD AND APPARATUS TO HANDLE PTP PTM RECEPTION OF NR MBS," the content of which is hereby incorporated herein fully by reference into the present disclosure.

FIELD

The present disclosure is generally related to wireless communications and, more specifically, to a method of triggering a packet data convergence protocol (PDCP) status report and a related device configured to employ the method.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability for optimizing network services and types, and accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication in the next-generation wireless communication system.

Abbreviation used in this disclosure include:
Abbreviation Full Name
  3 GPP 3rd Generation Partnership Project
  5G 5th generation
  ACK Acknowledgement
  AM Acknowledgement mode
  ARQ Automatic Repeat Request
  BL Bandwidth reduced Low complexity
  BS Base Station
  BSR Buffer Status Report
  BWP Band Width Part
  CA Carrier Aggregation
  CC Component Carriers
  CCCH Common Control CHannel
  CE Control Element
  CG Cell Group
  CN Core Network
  CORESET Control Resource Set
  C-RNTI Cell-Radio Network Temporary Identifier
  CRC Cyclic Redundancy Check
  DAPS Dual Active Protocol Stack
  DCI Downlink Control Information
  DL Downlink
  DL-SCH Downlink Shared Channel
  DRB Data Radio Bearer
  E-UTRA Evolved Universal Terrestrial Radio Access
  E-UTRAN Evolved Universal Terrestrial Radio Access Network
  G-RNTI Group Radio Network Temporary Identifier
  HARQ Hybrid Automatic Repeat Request
  IE Information Element
  L1 Layer 1
  L2 Layer 2
  LCG Logical Channel Group
  LCH Logical Channel
  LCD Logical Channel Identity
  LTE Long Term Evolution
  MAC Medium Access Control
  MBMS Multimedia Broadcast Multicast Service
  MBS Multicast-Broadcast Service
  MBSFN Multicast Broadcast Single Frequency Network
  MCE Multi-cell/multicast Coordination Entity
  MCG Master Cell Group
  MCH Multicast Channel
  MIMO Multi-input Multi-output
  MRB Multicast Broadcast Service Radio Bearer
  MSG Message
  NB-IoT Narrow Band Internet of Things
  NDI New Data Indicator
  NR New RAT/Radio
  NUL Normal Uplink
  NW Network
  PCell Primary Cell
  PDCCH Physical Downlink Control Channel
  PDCP Packet Data Convergence Protocol
  PDSCH Physical Downlink Shared Channel
  PDU Protocol Data Unit
  PHY Physical Layer
  PMCH Physical Multicast Channel
  PSCell Primary SCell
  PTAG Primary Timing Advance Group
  PTM Point to Multipoint
  PTP Point to Point
  PUCCH Physical Uplink Control Channel
  PUSCH Physical Uplink Shared Channel
  RA Random Access
  RLC Radio Link Control
  RNTI Radio Network Temporary Identifier
  RRC Radio Resource Control
  SCell Secondary Cell
  SCG Secondary Cell Group
  SC-MCCH Single Cell Multicast Control Channel
  SC-MTCH Single Cell Multicast Traffic Channel
  SC-N-RNTI Single Cell Notification Radio Network Temporary Identifier
  SC-PTM Single Cell Point to Multipoint
  SC-MRB Single Cell Multicast Broadcast Service Radio Bearer
  SC-RNTI Single Cell Radio Network Temporary Identifier
  SDAP Service Data Adaptation Protocol
  SDU Service Data Unit
  SIB System Information Block
  SR Scheduling Request
  SRB Signaling Radio Bearer
  SS Search Space
  SpCell Special Cell
  SPS Semi Persistent Scheduling
  SUL Supplementary Uplink
  TA Timing Advance
  TAG Timing Advance Group
  TB Transport Block
  TMGI Temporary Mobile Group Identity TR Technical Report
TRP Transmission/Reception Point
TS Technical Specification
UE User Equipment
UL Uplink
UL-SCH Uplink Shared Channel
UM Unacknowledged Mode
WI Work Item
5GS 5G System

SUMMARY

The present disclosure provides a method of triggering a packet data convergence protocol (PDCP) status report and a related device.

According to an aspect of the present disclosure, a method of triggering a PDCP status report performed by a user equipment (UE) is provided. The method includes receiving, from a network, a Data Radio Bearer (DRB) configuration that is associated with a first PDCP entity of the UE; receiving, from the network, a Multicast Broadcast Service Radio Bearer (MRB) configuration that is associated with a second PDCP entity of the UE; triggering, by the first PDCP entity, a first PDCP status report based on a first configuration of the first PDCP entity; and triggering, by the second PDCP entity, a second PDCP status report based on a second configuration of the second PDCP entity.

According to another aspect of the present disclosure, a UE for triggering a PDCP status report is provided. The UE includes a processor configured to execute a computer-executable program, and a memory coupled to the processor and configured to store the computer-executable program, wherein the computer-executable program instructs the processor to cause the UE to perform the above-disclosed method of triggering the PDCP status report.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
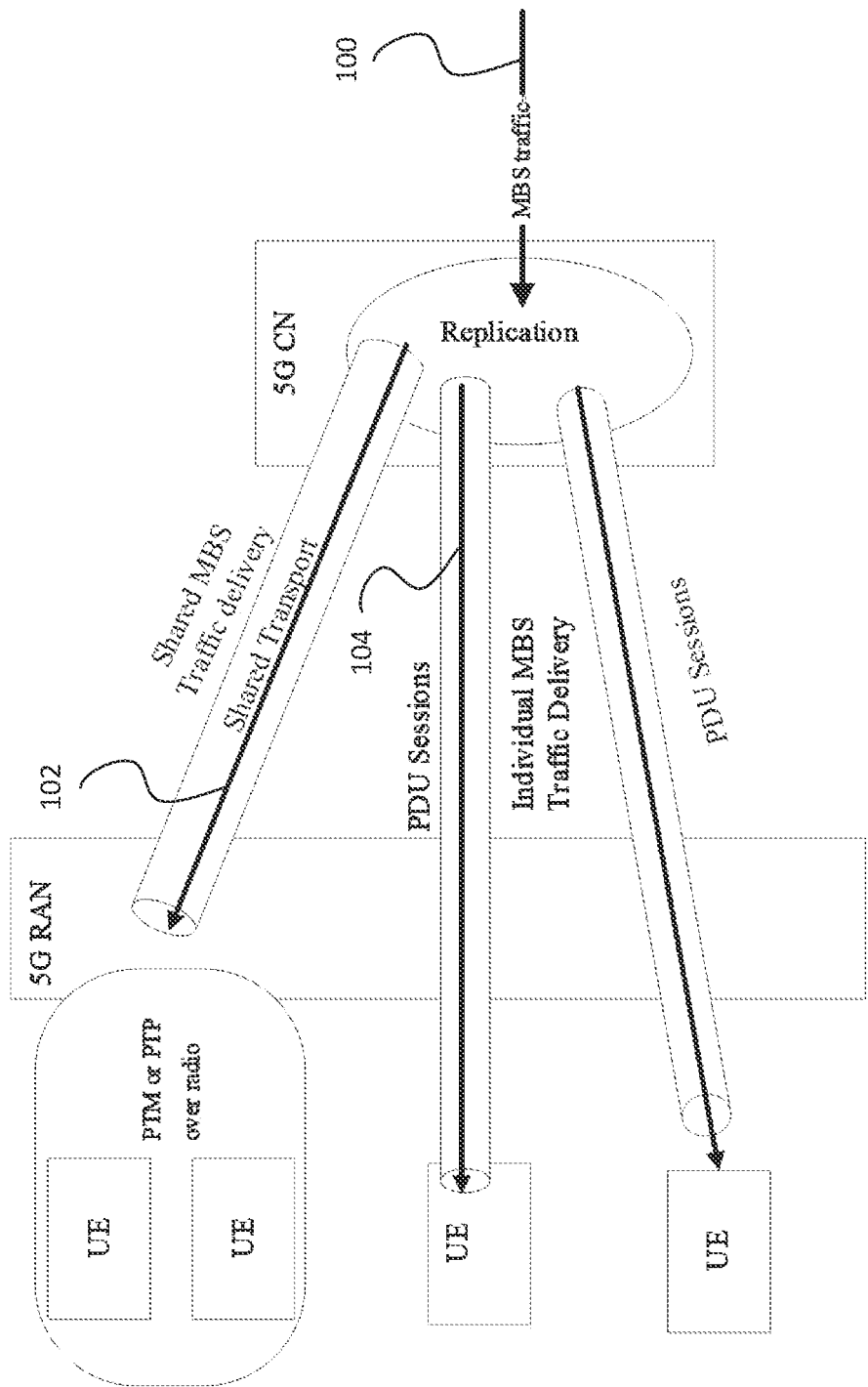
FIG. 1 is a schematic diagram illustrating a PTP/PTM transmission scheme with a 5GC shared delivery method and a 5GC individual delivery method, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is illustrated in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Further, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium, such as memory or other types of storage devices. For example, one or more microprocessors or general-purpose computers with communication processing capability may be programmed with corresponding executable instructions and carry out the disclosed network function(s)

or algorithm(s). The microprocessors or general-purpose computers may be formed of Application-Specific Integrated Circuits (ASICs), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more B Ss.

A UE according to the present disclosure may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are applicable in NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

LTE MBMS

LTE MBMS aims to provide an efficient mode of delivery of both broadcast and multicast services over the core network. Typically, a broadcast service is provided via a DL-only point-to-multipoint transmission from the network to multiple UEs. The content of the broadcast service is transmitted once to all the UEs in a geographical area, and users are free to choose whether or not to receive it. On the other hand, a multicast service is provided via a DL-only point-to-multipoint transmission from the network to a managed group of UEs. The content of the multicast service is transmitted once to the whole group, and only the users belonging to the managed group may receive it.

A UE may receive the MBMS (from the network) while the UE is in an RRC_IDLE state. Alternatively, a UE may receive the MBMS (from the network) in the RRC_CONNECTED state (e.g., when the UE is not an NB-IoT UE, BL UE, or UE in enhanced coverage).

Transmission of an MBMS in the E-UTRAN may be either an MBSFN transmission or an SC-PTM transmission.

The MCE makes the decision on whether to use the SC-PTM transmission or the MB SFN transmission for each MBMS session.

LTE MBMS Transmission Via SC-PTM Transmission

MBMS transmitted via SC-PTM transmission has the following characteristics:

MBMS is transmitted in the coverage of a single cell.

One SC-MCCH and at least one SC-MTCH can be mapped on the DL-SCH.

In some implementations, the DL-SCH is mapped to the PDSCH.

In some implementations, the SC-MCCH and the SC-MTCH are logical channels.

In some implementations, the SC-MCCH is a point-to-multipoint downlink channel used for transmitting MBMS control information (e.g., SCPTMConfiguration message) from the network to the UE, for at least one SC-MTCH. The SC-MCCH is only used by the UEs that receive or are interested in receiving MBMS via the SC-PTM.

In some implementations, the SC-MTCH is a point-to-multipoint downlink channel used for transmitting traffic data from the network to the UE via the SC-PTM transmission. The SC-MTCH is only used by UEs that receive MBMS via the SC-PTM.

At least one of the SC-MCCH and the SC-MTCH can be mapped on the SC-MRB.

In some implementations, the SC-MRB is a radio bearer used for reception of MBMS service that is transmitted via the SC-PTM.

Scheduling is performed by the eNB.

The SC-MCCH and the SC-MTCH transmissions (e.g., PDSCH used for transmission of SC-MCCH information and PDSCH used for transmission of SC-MTCH information) are each scheduled/indicated by a logical-channel-specific RNTI on PDCCH (e.g., there is a one-to-one mapping between the TMGI and the G-RNTI used for the reception of the DL-SCH to which a SC-MTCH is mapped).

In some implementations, the PDCCH (DCI) associated (e.g., CRC scrambled) with the SC-RNTI can be used to indicate the transmission of the SC-MCCH (e.g., the PDSCH on which the SC-MCCH is mapped).

In some implementations, the PDCCH (DCI) associated (e.g., CRC scrambled) with the G-RNTI can be used to indicate the transmission of the SC-MTCH (e.g., the PDSCH on which the SC-MTCH is mapped).

In some implementations, the value of the SC-RNTI is set to a hexadecimal value of 'FFFB'.

In some implementations, the value of the G-RNTI and a mapping between the G-RNTI and its respective TMGI/MBMS session is indicated via an SCPTMConfiguration message (e.g., the SC-MCCH). A single SCPTMConfiguration message can indicate a list of one or multiple G-RNTIs and their respective TMGIs/MBMS sessions.

A single transmission is used for the DL-SCH (e.g., neither blind HARQ repetitions nor RLC quick repeat) on which the SC-MCCH or the SC-MTCH is mapped.

The SC-MCCH and the SC-MTCH use the RLC-UM.

MBS Transmission Method Via Unicast Transmission and Multicast Transmission

The broadcast/multicast service may be delivered from a single data source (e.g., the MBS server) to multiple UEs. Multiple delivery methods may be used to deliver MBS traffic in the 5GS.

From the 5G CN point of view, two delivery methods are possible for the MBS:

5GC individual delivery method for MBS traffic

The 5G CN receives a single copy of the MBS data packets and delivers separate copies of the MBS data packets to individual UEs via per-UE PDU sessions. Hence, for each such UE, one PDU session is required to be associated with an MBS session. This delivery method may be referred to as a unicast delivery method.

5GC shared delivery method for MBS traffic

The 5G CN receives a single copy of the MBS data packets and delivers a single copy of the MBS data packets to a gNB, which then delivers the MBS data packets to one or multiple UEs.

From the RAN point of view (in the case of a 5GC shared MBS traffic delivery method), two transmission schemes may be used for a transmission of MBS packet flows over radio (e.g., between the gNB and the UE):

PTP transmission scheme

A gNB delivers separate copies of the MBS data packet over radio to individual UEs.

PTM transmission scheme

FIG. 1 is a schematic diagram illustrating a PTP/PTM transmission scheme with a 5GC shared delivery method and a 5GC individual delivery method, according to an implementation of the present disclosure. A gNB delivers a single copy of the MBS data packets over radio to a set of UEs. PTP or PTM delivery with the 5GC shared delivery method (e.g., the shared MMBS traffic delivery 102) and the 5GC individual MBS traffic delivery method (e.g., the individual MBS traffic delivery 104) may be used at the same time for an MBS session (e.g., MBS traffic 100).

For the 5GC individual delivery method, the transmission of the MBS session over radio is performed on the PDCCH for the C-RNTI and the DL-SCH MAC PDU is received by the UE.

For the PTP transmission scheme, a DCI associated with the C-RNTI may be transmitted on the PDCCH for scheduling a UE-specific PDSCH in the DL. The UE-specific PDSCH (scrambled by the C-RNTI) may include the MBS data packet. The PTP transmission scheme may be referred to as unicast transmission in the present disclosure.

For the PTM transmission scheme, a DCI associated with the G-RNTI may be transmitted on the PDCCH for scheduling a group-common PDSCH in the DL. The group-common PDSCH (scrambled by the G-RNTI) may include the MBS data packet. The PTM transmission scheme may also be referred to as PTM transmission scheme 1 or multicast transmission in the present disclosure.

For the PTM transmission scheme, a DCI associated with the C-RNTI may be transmitted on the PDCCH for scheduling a group-common PDSCH in the DL. The group-common PDSCH (scrambled by the G-RNTI) may include the MBS data packet. The PTM transmission scheme may also be referred to as PTM transmission scheme 2 or multicast transmission in the present disclosure.

The PTM transmission scheme may have the same features as LTE MBMS transmitted via the SC-PTM transmission. That is, a G-RNTI may be associated with at least one MBS. Moreover, each MBS may be associated with an MBS ID (e.g., TMGI, MBS session ID, etc.). In some implementations, the network may transmit a message that includes a list of one or multiple G-RNTIs and their respective MBSs (e.g., TMGI, MBS session ID, etc.) to one or multiple UEs. Hence, a UE may maintain multiple G-RNTIs, and multiple UEs may share the same G-RNTI.

Dynamic Switching Indication

According to the NR MBS mechanism, a dynamic change of MBS delivery between the PTM transmission scheme and the PTP transmission scheme with service continuity for a UE is supported. In other words, the network may dynamically change the MBS providing data packets to a UE between the PTP transmission scheme and the PTM transmission scheme. Moreover, the network may make the decision regarding the dynamic switching between the PTP transmission scheme and the PTM transmission scheme. Whenever the network makes the decision regarding dynamic switching from the PTP transmission scheme to the PTM transmission scheme and/or vice versa for one or more MBSs, a dynamic switching indication may be transmitted to the UE that receives the one or more MBSs.

One 5G protocol entity (e.g., a PDCP entity, RLC entity, SDAP entity, etc.) may act as an anchor entity to support dynamic switching between the PTP transmission scheme and the PTM transmission scheme.

Figure 2:
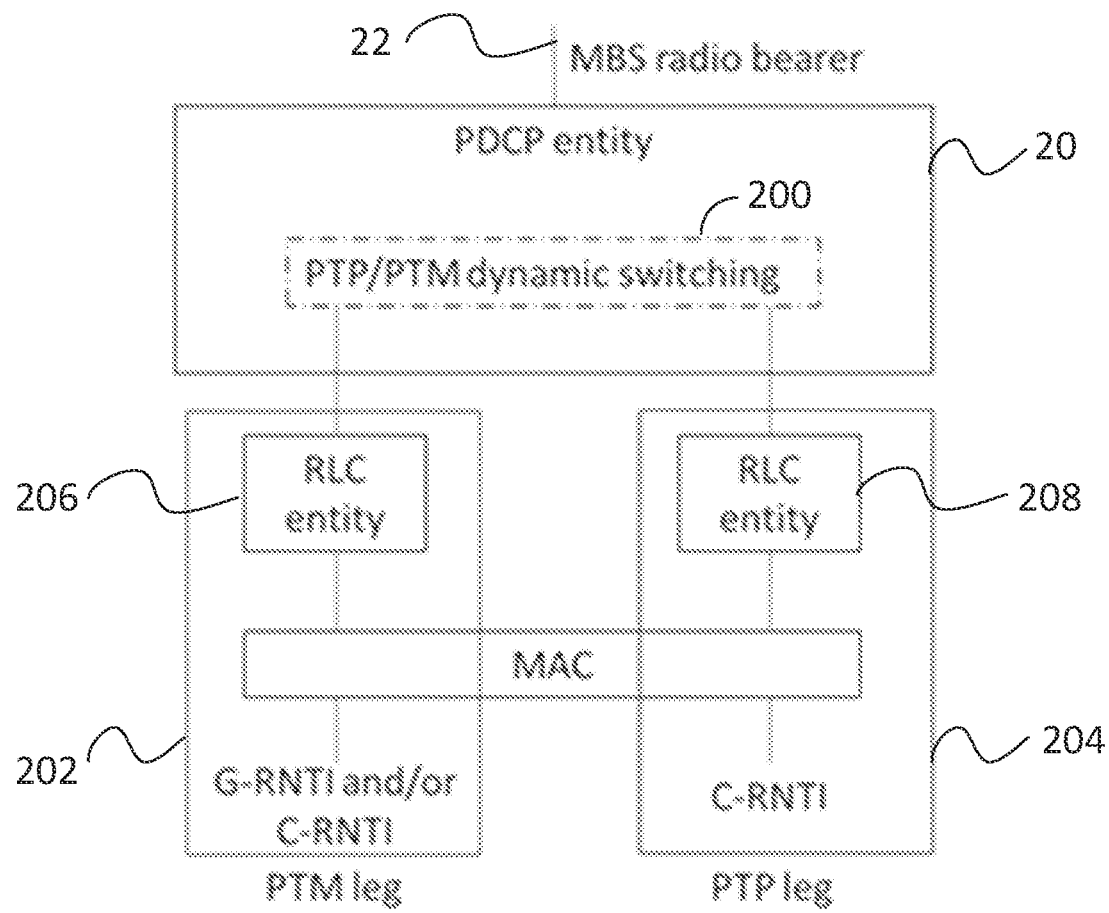
FIG. 2 is a schematic diagram illustrating dynamic switching between a PTP transmission scheme and a PTM transmission scheme, according to an implementation of the present disclosure.

FIG. 2 is a schematic diagram illustrating dynamic switching between a PTP transmission scheme and a PTM transmission scheme, according to an implementation of the present disclosure. The PDCP entity 20 acting as an anchor entity is illustrated in FIG. 2. For PTM transmission scheme 1 (e.g., PTM leg 202 of FIG. 2), a UE may receive scheduling information (e.g., DCI associated with the G-RNTI) that schedules a group-common PDSCH. Moreover, for PTM transmission scheme 2 (e.g., PTM leg 202 of FIG. 2), the UE may receive scheduling information (e.g., DCI associated with the C-RNTI) that schedules a group-common PDSCH. On the other hand, for the PTP transmission scheme (e.g., PTP leg 204 of FIG. 2), the UE may receive scheduling information (e.g., DCI associated with the C-RNTI) that schedules a UE-specific PDSCH. In this case, the group-common/UE-specific PDSCH may be used to transmit DL data from the MBS radio bearer (MRB) 22 that is associated with the PDCP entity.

In some implementations, different PDCCH/CORESET/SS configurations may be associated with different transmission schemes (e.g., the PTP transmission scheme, PTM transmission scheme 1, and PTM transmission scheme 2). If the PDCP entity 20 of the UE receives a dynamic switching indication (e.g., PTP/PTM dynamic switching 200) that indicates a change of transmission scheme (e.g., from the PTM transmission scheme to the PTP transmission scheme or from the PTP transmission scheme to the PTM transmission scheme), the UE may stop monitoring the PDCCH/CORESET/SS/MBS common frequency resource that corresponds to the transmission scheme before the UE receives the dynamic switching indication. Moreover, the UE may start monitoring the PDCCH/CORSET/SS/MBS common frequency resource that corresponds to the transmission scheme indicated by the dynamic switching indication.

Figure 3:
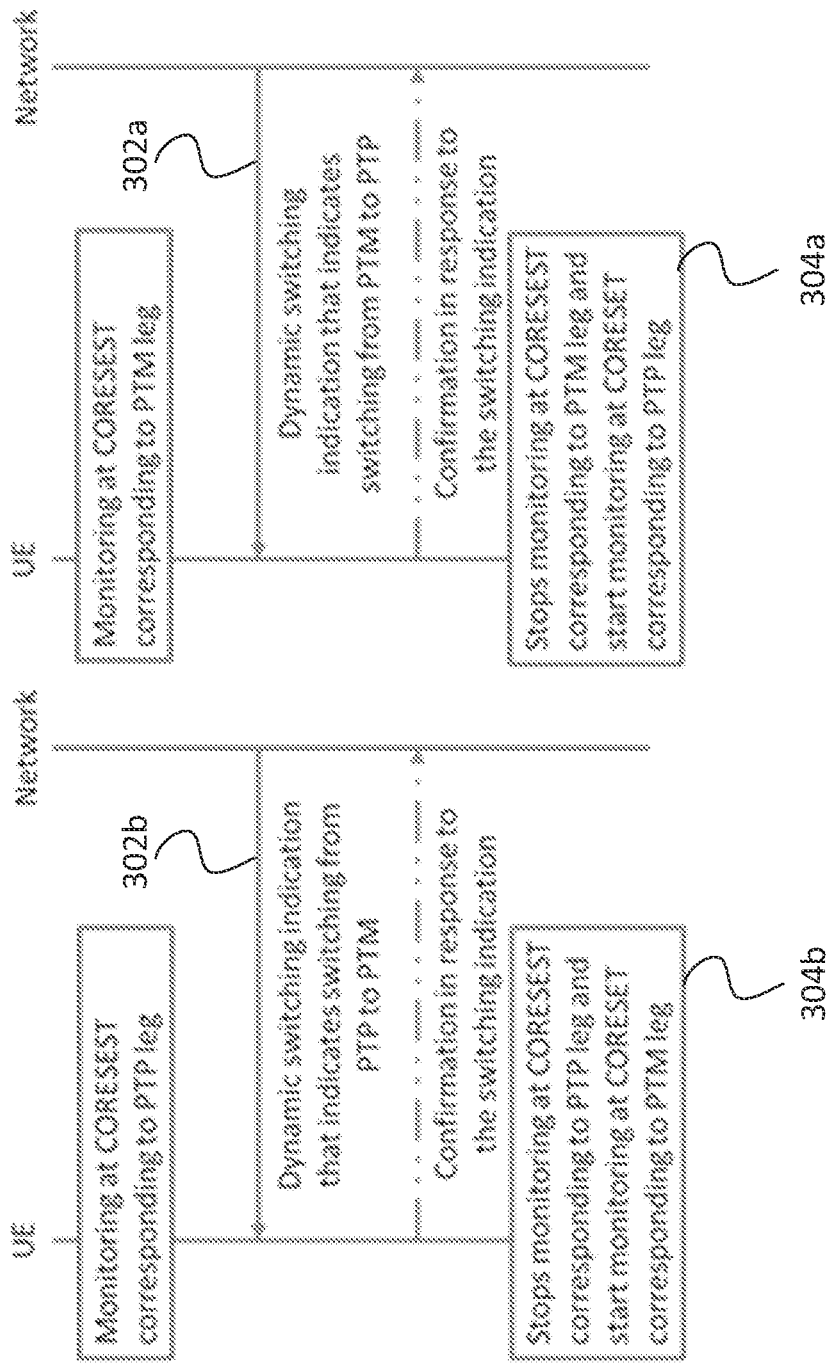
FIG. 3 is a schematic diagram illustrating a dynamic switching indication, according to an implementation of the present disclosure.

FIG. 3 is a schematic diagram illustrating a dynamic switching indication, according to an implementation of the present disclosure. In some examples, different RNTIs may be associated with different transmission schemes (e.g., G-RNTI for the PTM transmission scheme and/or C-RNTI for the PTP transmission scheme). Hence, if a UE receives, from the network, a dynamic switching indication 302a or 302b that indicates a change of transmission scheme (e.g., from the PTM transmission scheme to the PTP transmission scheme, as shown on the right side of FIG. 3, or from the PTP transmission scheme to the PTM transmission scheme, as shown on the left side of FIG. 3), the UE may stop PDCCH monitoring (e.g., CORESET) for the specific RNTI that corresponds to the transmission scheme (e.g., a PTM leg or a PTP leg), and may start PDCCH monitoring for the RNTI that corresponds to the transmission scheme (e.g., the PTP leg or the PTM leg) indicated by the dynamic switching indication 302a or 302b.

The 3GPP NR Rel-17 MBS WI discloses that a UE may receive an MBS from the network via either the PTM transmission scheme (e.g., PTM transmission scheme 1 and PTM transmission scheme 2) or the PTP transmission scheme. Moreover, a PDCP layer/entity may act as an anchor to enable dynamic switching between the PTM transmission scheme and the PTP transmission scheme (e.g., the UE may switch between a PTP leg and a PTM leg that is associated with the same anchor PDCP layer/entity).

However, the configuration of association between a PDCP/RLC entity and an MBS radio bearer (MRB), and the configuration of association between a PDCP entity and a PTP/PTM leg for a PTP/PTM transmission scheme are not specified. Hence, the detailed signaling design for configuring a PDCP entity and its associated PTP/PTM leg(s) is disclosed.

The 3GPP NR Rel-17 MBS WI further discloses the reliability of NR MBS. Some MBSs may have high reliability requirements (e.g., the MBS for emergency use). To improve the reliability of those MBSs, dynamic switching between the PTM transmission scheme and the PTP transmission scheme may be performed. For example, when the radio quality is poor, the network may switch from the PTM transmission scheme (e.g., the PTM leg) to the PTP transmission scheme (e.g., the PTP leg) for an MBS. Moreover, the network may also inform the UE that the transmission scheme has been switched via a dynamic switching indication so that the UE may perform different MBS reception behavior (e.g., receiving the MBS via different RNTIs, PDCCHs, CORESETs, SSs, MBSs and/or common frequency resources). However, the packet loss (e.g., during MBS reception) may occur when the UE switches from the PTM transmission scheme (e.g., the PTM leg) to the PTP transmission scheme (e.g., the PTP leg) or from the PTP transmission scheme (e.g., the PTP leg) to the PTM transmission scheme (e.g., the PTM leg). Therefore, the UE may trigger a PDCP status report when the UE switches from the PTM transmission scheme to the PTP transmission scheme or from the PTP transmission scheme to the PTM transmission scheme. As such, the UE may indicate the missing PDCP SDUs via the PDCP status report. The present disclosure introduces the detailed design to trigger/transmit a PDCP status report for reliability improvement.

Configuration of an MBS Radio Bearer

1. Association Between an RLC Entity and an MBS Radio Bearer (MRB)

In some implementations, to associate an RLC entity with an MRB, associate an RLC entity to an LCH, and associate an LCH to an MRB, the network may include the identity of the MRB (e.g., MBS-RB-Identity IE in Table 1 illustrating an association between an RLC entity and an MRB) in the IE that configures the RLC entity (e.g., RLC-BearerConfig IE in Table 1). Moreover, the network may include the identity of the LCH (e.g., LogicalChannelIdentity IE in Table 1) in the IE that configures this RLC entity (e.g., RLC-BearerConfig in Table 1). In some implementations, the identity of the MRB (e.g., MBS-RB-Identity IE) may be included in a new IE (e.g., servedRadioBearer-MBS in Table 1A illustrating an association between an RLC entity and an MRB) other than servedRadioBearer.

TABLE 1

-- ASN1START
-- TAG-RLC-BEARERCONFIG-START
RLC-BearerConfig ::=          SEQUENCE {
    logicalChannelIdentity        LogicalChannelIdentity,

TABLE 1-continued

```
    servedRadioBearer            CHOICE {
        srb-Identity                 SRB-Identity,
        drb-Identity                 DRB-Identity,
        mbs-RB-Identity              MBS-RB-Identity
    }
    rlc-Config                   RLC-Config
}
-- TAG-RLC-BEARERCONFIG-STOP
-- ASN1STOP
```

TABLE 1A

```
-- ASN1START
-- TAG-RLC-BEARERCONFIG-START
RLC-BearerConfig ::=             SEQUENCE {
    logicalChannelIdentity           LogicalChannelIdentity,
    servedRadioBearer-MBS            CHOICE {
        mbs-RB-Identity                  MBS-RB-Identity,
    }
    servedRadioBearer            CHOICE {
        srb-Identity                 SRB-Identity,
        drb-Identity                 DRB-Identity,
    }
    rlc-Config                   RLC-Config
}
-- TAG-RLC-BEARERCONFIG-STOP
-- ASN1STOP
```

TABLE 2-continued

```
RLC-BearerConfig ::=             SEQUENCE {
    Mbs-id                           MBS ID
}
-- TAG-RLC-BEARERCONFIG-STOP
-- ASN1STOP
```

TABLE 3

```
-- ASN1START
-- TAG-RADIOBEARERCONFIG-START
RadioBearerConfig ::=            SEQUENCE {
    mbs-rb-ToAddModList              MBS-RB-ToAddModList
}
MBS-RB-ToAddModList ::=          SEQUENCE (SIZE (1..maxMBS-RB)) OF
                                 MBS-RB-ToAddMod
MBS-RB-ToAddMod ::=              SEQUENCE {
    mbs-id                           MBS-ID
    mbs-RB-Identity                  MBS-RB-Identity,
    pdcp-Config                      PDCP-Config
}
-- TAG-RADIOBEARERCONFIG-STOP
-- ASN1STOP
```

TABLE 3A

```
-- ASN1START
-- TAG-RADIOBEARERCONFIG-START
RadioBearerConfig ::=            SEQUENCE {
drb-ToAddModList                 DRB-ToAddModList
}
DRB-ToAddModList ::=             SEQUENCE (SIZE (1..maxDRB)) OF DRB-ToAddMod
DRB-ToAddMod ::=                 SEQUENCE {
    drb-Identity                     DRB-Identity,
    mbs-id                           MBS-ID
    pdcp-Config                      PDCP-Config
}
-- TAG-RADIOBEARERCONFIG-STOP
-- ASN1STOP
```

In some implementations, to associate an RLC entity with an MRB, the network may include the MBS ID (e.g., MBS-ID in Table 2 illustrating a mapping between an RLC entity and an MBS ID) in the IE that configures the RLC entity (e.g., RLC-BearerConfig IE in Table 2). The MBS ID is an identifier indicated by the gNB to be associated with an MBS service. In some examples, the MBS ID may be a G-RNTI, TMGI, MBS session ID, LCD, bearer ID, or QoS flow ID. Moreover, the network may include the MBS ID (e.g., MBS-ID in Table 2) in the IE that is used to add or modify the MRB (e.g., MBS-RB-ToAddMod IE in Table 3). As such, two or more RLC entities may be associated with the same MRB when these RLC entities are mapped to the same MBS ID.

In some implementations, the network may also configure multiple MRBs to a UE simultaneously. The network may include a list of MRBs in the IE that is used to add the MRB (e.g., MBS-RB-ToAddMod IE in Table 3).

TABLE 2

```
-- ASN1START
-- TAG-RLC-BEARERCONFIG-START
```

2. Association Between a PDCP Entity and an MRB

In some implementations, to associate a PDCP entity to an MRB, the network may include the identity of the MRB (e.g., MBS-RB-Identity IE in Table 3) and the IE that configures the PDCP parameters of the PDCP entity (e.g., PDCP-Config IE in Table 3) in the same IE that is used to add the MRB (e.g., MBS-RB-ToAddMod IE in Table 3).

In some implementations, to associate a PDCP entity to an MRB, the network may include the identity of the MRB (e.g., DRB-Identity IE in Table 3A illustrating a mapping between an MRB and an MBS ID) with an MBS ID (e.g., MBS ID in Table 3A) and the IE that configures the PDCP parameters of the PDCP entity (e.g., PDCP-Config IE in Table 3A) in the same IE that is used to add the MRB (e.g., DRB-ToAddMod IE in Table 3A).

3. Association Between an RLC Entity and a PDCP Entity

In some implementations, to associate a PDCP entity to an RLC entity, the network may map the RLC entity and the PDCP entity to the same MRB and/or MBS. For example, if an RLC entity and a PDCP entity are mapped to the same MRB identity (e.g., the same MBS-RB-Identity) and/or the same MBS ID (e.g., the same G-RNTI, TMGI, MBS session ID, LCID, bearer ID, or QoS flow ID), the RLC entity may be associated with the PDCP entity.

It should be noted that the network may configure the association between the RLC entity and the MRB, the association between the PDCP entity and the MRB, and/or the association between the RLC entity and the PDCP entity, via a broadcast system information (e.g., SIB) and/or a dedicated signaling (e.g., dedicated RRC signaling). For example, the network may configure the RLC-BearerConfig IE, RadioBearerConfig IE, and/or PDCP-Config IE via broadcast system information (e.g., SIB). In some implementations, the network may configure the association between the RLC entity and the MRB, the association between the PDCP entity and the MRB, and/or the association between the RLC entity and the PDCP entity before or when the UE performs the RRC connection release procedure. That is, the UE may receive the corresponding configuration(s) for the previously mentioned association via the DL RRCRelease message.

Configuration of an Anchor PDCP Entity

In some implementations, the network may associate at least one of a PTP leg and a PTM leg to a PDCP entity of a UE. In a case that the PDCP entity is associated with a PTP leg and a PTM leg, the PDCP entity may act as an anchor layer/entity to enable dynamic leg switching between the PTP leg and the PTM leg. Here, the dynamic switching may be performed by the UE (e.g., UE-initiated leg switching in order to receive the DL data for a transmission/retransmission) or triggered by the network (e.g., the UE performs leg switching after the UE receives a dynamic switching indication from the network).

In some implementations, the PTP leg may be referred to as an RLC entity that is associated with the PDCP entity. Moreover, the PTP leg may have at least one of the following characteristics:

The PTP leg may be an RLC AM entity

In some examples, the network may configure an RLC AM entity by including at least one of an IE, UL-AM-RLC IE and DL-AM-RLC IE in the IE that configures the RLC entity (e.g., RLC-Config IE).

The PTP leg may be identified with a specific IE (e.g., PTP-leg IE).

In some examples, if a specific IE is presented (e.g., with a specific value), the RLC entity may be regarded as a PTP leg. In contrast, if a specific IE is not presented (e.g., with a specific value), the RLC entity may not be regarded as a PTP leg. Instead, the RLC entity may be regarded as a PTM leg. In some examples, the specific IE (e.g., PTP-leg IE in Table 4 illustrating an IE that used for identifying a PTP leg and/or a PTM leg) may be included in the IE that configures the RLC entity (e.g., RLC-BearerConfig IE in Table 4).

The PTP leg may be mapped to a LCH with a specific LCID value.

In some examples, if an RLC entity is mapped to an LCH with an LCID value for a DL-SCH (e.g., LCID with codepoint/index of 1-32), the RLC entity may be regarded as a PTP leg. In contrast, if an RLC entity is mapped to an LCH with an LCID value specifically for a PTM leg, the RLC entity may be regarded as the PTM leg. In this case, the LCID value specifically for the PTM leg may be configured by the network via broadcast system information (e.g., SIB) or a dedicated signal (e.g., a dedicated RRC signal). Alternatively, the LCID value specifically for the PTM leg may be preconfigured in the UE (e.g., defined in the 3 GPP technical specification).

The LCID value specifically for the PTM leg may be referred to as an LCID value that is associated with/maps to a G-RNTI/MBS D. The network may map a G-RNTI/MBS ID to one or multiple LCID values. The previously mentioned mapping may be configured by the network via broadcast system information (e.g., SIB) or dedicated signaling (e.g., dedicated RRC signaling).

In some implementations, the PTM leg may be referred to as an RLC entity that is associated with the PDCP entity. Moreover, the PTM leg may have at least one of the following characteristics:

The PTM leg may be an RLC UM entity

In some examples, the network may configure an RLC UM entity by including UL-UM-RLC IE and/or DL-UM-RLC IE in the IE that configures the RLC entity (e.g., RLC-Config IE).

The PTM leg may be identified with a specific IE (e.g., PTM-leg IE).

In some examples, if a specific IE is presented (e.g., with a specific value), the RLC entity may be regarded as a PTM leg. In contrast, if a specific IE is not presented (e.g., with a specific value), the RLC entity may not be regarded as a PTM leg. Instead, the RLC entity may be regarded as a PTP leg. In one example, the specific IE (e.g., PTM-leg IE in Table 4) may be included in the IE that configures the RLC entity (e.g., RLC-BearerConfig IE in Table 4). In some examples, if the specific IE (e.g., PTM-leg IE) is indicated with a value of TRUE for a RLC entity, the RLC entity may be regarded as a PTM leg.

The PTM leg may be mapped to an LCH with an LCID value specifically for PTM leg.

In some implementations, when the PDCP entity is associated with more than one leg (e.g., a PTP leg and a PTM leg), the PDCP entity may be configured with a specific IE. The specific IE may be used to indicate the primary path/primary RLC entity of the PDCP entity. Alternatively, the specific IE may be used to indicate the leg that a UE may be used for MBS data reception. For example, if the specific IE indicates a PTP leg, the UE may perform MBS data reception with the PTP leg.

In some implementations, the PTP leg and the PTM leg may use the same LCID values (e.g., LCID with codepoint/index of 1-32).

In some implementations, a UE may receive a DL assignment associated with a G-RNTI to schedule a PDSCH. Moreover, a MAC PDU may be received on the PDSCH scheduled by the G-RNTI. The MAC PDU may include data from a specific MBS that corresponds to the G-RNTI. The data of the specific MBS may be from an MRB (e.g., MRB 22 of FIG. 2). The MAC PDU may include one or more MAC subPDUs. Each of the one or more MAC subPDUs may include a MAC subheader and a MAC SDU. An LCID value may be included in the MAC subheader of the MAC subPDU. The LCID may correspond to the MAC SDU that is included in the MAC subPDU. Based on the LCID value that corresponds to the MAC SDU, the MAC entity of the UE may deliver the MAC SDU to an RLC entity with the same LCID (e.g., the RLC-BearerConfig of the RLC entity includes the same LCID value as the LCID value of the received MAC SDU). Moreover, the RLC entity may be associated with an MRB (e.g., the RLC-BearerConfig of the RLC entity includes an MRB identity). The reason is that the MAC PDU includes MBS data from one or multiple MRBs. Moreover, the RLC entity may be regarded as a PTM leg (e.g., the RLC-BearerConfig of the RLC entity includes a specific indication with a specific value (e.g., PTM-leg IE with value TRUE) to be a PTM leg). The reason is that DL assignment associated with a G-RNTI is used for scheduling DL data from a PTM leg (e.g., PTM leg 202 of FIG. 2). That is, the MAC entity may deliver the received MAC SDU to the correct RLC entity based on the presence of the PTM-leg IE included the RLC entity and the LCID value of the LCH that the RLC entity corresponds to.

In some implementations, a UE may receive a first DL assignment associated with a C-RNTI to schedule a first PDSCH. Moreover, a MAC PDU may be received on the first PDSCH scheduled by the C-RNTI. The MAC PDU may include data from a specific MBS that is transmitted via a PTP leg/PTP transmission scheme (e.g., PTP leg 204 of FIG. 2). Preferably, the UE may determine that the MAC PDU includes data from a specific MBS that is transmitted via a PTP transmission scheme based on a HARQ process ID and an NDI value of the first DL assignment. If the first DL assignment has a HARQ process ID, and a previously received second DL assignment, which is associated with the same HARQ process ID as the first DL assignment, is associated with the UE's G-RNTI, and the NDI value of the first DL assignment is not toggled when compared with an NDI value of the second DL assignment, the UE may consider the MAC PDU received on the first PDSCH to include data from a specific MBS. The data of the specific MBS may be from an MRB (e.g., MRB 22 of FIG. 2). The MAC PDU may include one or more MAC subPDUs. Each of the one or more MAC subPDUs may include a MAC subheader and a MAC SDU. An LCID value may be included in the MAC subheader of the MAC subPDU. The LCID may correspond to the MAC SDU that is included in the MAC subPDU. Based on the LCID value that corresponds to the MAC SDU, the MAC entity of the UE may deliver the MAC SDU to an RLC entity with the same LCID (e.g., the RLC-BearerConfig of the RLC entity includes the same LCID value as the LCID value of the received MAC SDU). Moreover, the RLC entity may be associated with an MRB (e.g., the RLC-BearerConfig of the RLC entity includes an MRB identity). The reason is that the MAC PDU includes MBS data from one or multiple MRBs. Moreover, the RLC entity may be regarded as a PTP leg (e.g., the RLC-BearerConfig of the RLC entity includes a specific indication without a specific value (e.g., PTM-leg IE not with value TRUE) to be a PTP leg). The reason is that the first DL assignment, which is associated with the UE's C-RNTI, may be for scheduling (retransmission) MBS data via a PTP leg/PTP transmission scheme, as illustrated in PTP leg 204 of FIG. 2. That is, the MAC entity may deliver the received MAC SDU to the correct RLC entity based on the presence of the PTM-leg IE included the RLC entity and the LCID value of the LCH that the RLC entity corresponds to.

The specific IE may be included in the IE that is used to set the PDCP parameters of the PDCP entity (e.g., PDCP-Config IE)

The specific IE may be included in the IE that is used for associating an RLC entity with an MRB (e.g., RLC-BearerConfig IE)

TABLE 4

| |
|---|
| -- ASN1START |
| -- TAG-RLC-BEARERCONFIG-START |
| RLC-BearerConfig ::=    SEQUENCE { |
|     PTM-leg             ENUMERATED { true } |
|     PTP-leg             ENUMERATED { true } |
| } |
| -- TAG-RLC-BEARERCONFIG-STOP |
| -- ASN1STOP |

It may be noted that if a UE is currently receiving on the PTP leg, the UE may be expected to perform the PTP transmission scheme. In other words, the UE may receive the MBS, from the network, via the PTP transmission scheme. On the other hand, if the UE is receiving on the PTM leg, the UE may be expected to receive the MBS, from the network, via the PTM transmission scheme.

Triggering/Transmitting a PDCP Status Report

Figure 4:
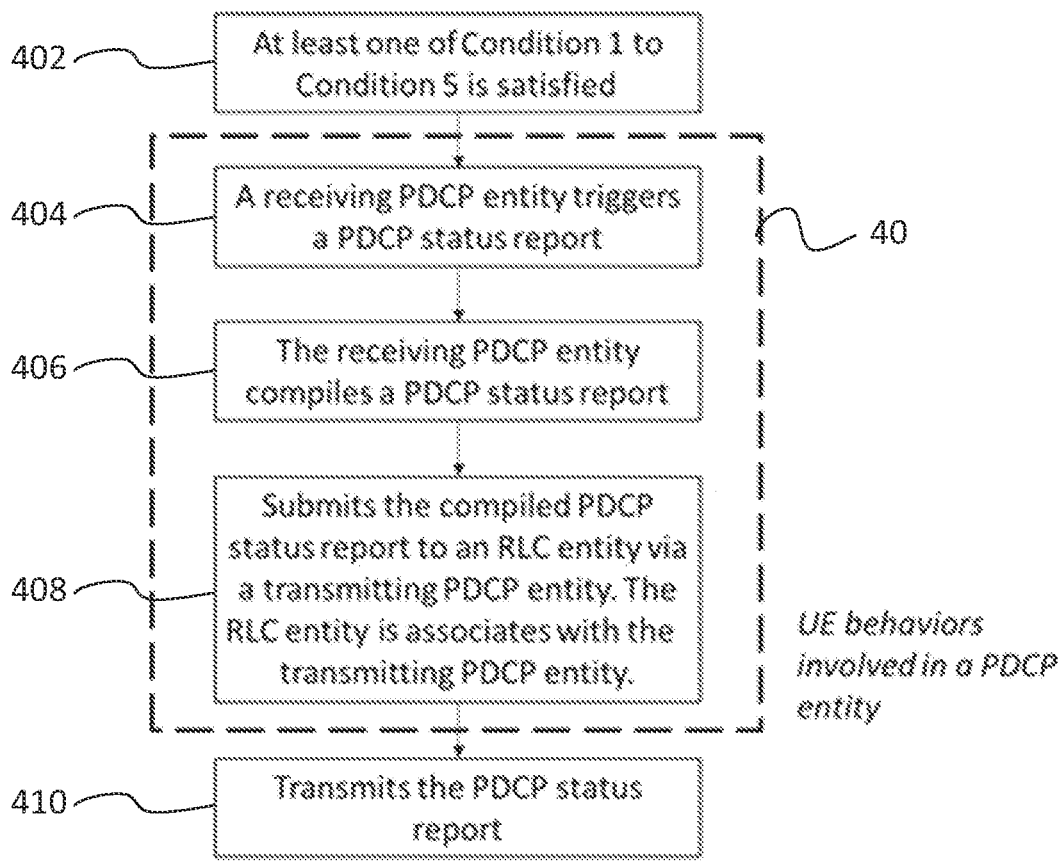
FIG. 4 is a schematic diagram illustrating a triggering/transmission of a PDCP status report, according to an implementation of the present disclosure.

A PDCP entity of a UE may trigger a PDCP status report when at least one of the conditions listed below (e.g., from Condition 1 through Condition 5, discussed below) is satisfied. The at least one of the conditions listed below may occur when a dynamic leg switching is performed. Subsequently, the PDCP entity of the UE may compile a PDCP status report. The compiled PDCP status report may then be transmitted, by the entity, to a lower layer of the UE. The lower layer of the UE may be referred to as an RLC/MAC/PHY entity that is associated with the PDCP entity. FIG. 4 is a schematic diagram illustrating a triggering/transmission of a PDCP status report, according to an implementation of the present disclosure.

In some implementations, the PDCP entity 40 may include a transmitting PDCP entity and a receiving PDCP entity. The transmitting PDCP entity and the receiving PDCP entity may correspond to the same PDCP configuration. In addition, the transmitting PDCP entity and the receiving PDCP entity may be referred to as the same PDCP entity.

In some implementations, the transmitting PDCP entity may be associated with two RLC entities. For example, the transmitting PDCP entity may be associated with an RLC AM entity and an RLC UM entity. Preferably, the transmitting PDCP entity may determine which RLC entity is to transmit the PDCP status report based on specific conditions (as shown below).

Triggering a PDCP Status Report

In some implementations, a PDCP entity of a UE may be associated with a radio bearer (e.g., MRB or DRB). Moreover, the PDCP entity (e.g., the receiving PDCP entity) of the UE may determine to trigger a PDCP status report if at least one of the following conditions is satisfied (e.g., from Condition 1 through Condition 5) (e.g., actions 402-404). The PDCP entity (e.g., the receiving PDCP entity) of the UE further compiles the PDCP status report after the UE triggers the PDCP status report (e.g., action 406). Then, the PDCP entity (e.g., the transmitting PDCP entity) of the UE submits the compiled PDCP status report to the associated RLC entity and transmits the PDCP status report to the network (e.g., actions 408-410).

Condition 1: The PDCP entity of the UE has at least one specific characteristic.

In some implementations, the network may configure the radio bearer corresponding to the PDCP entity of the UE. Therefore, the UE that receives the radio bearer configuration may transmit a PDCP status report to the network.

The network may include a specific IE (e.g., statusReportRequired IE) in the IE that configures the PDCP parameters of the radio bearer (e.g., PDCP-Config IE). The specific IE may be used to indicate whether the radio bearer is configured to trigger a PDCP status report. If the specific IE has a first value (e.g., TRUE), the UE may trigger the PDCP status report. In contrast, if the specific IE has a second value (e.g., FALSE), the UE may not trigger the PDCP status report.

In some examples, an MRB may be configured with a statusReportRequired IE in the radio bearer configuration (e.g., the PDCP configuration associated with the MRB). In some examples, the statusReportRequired IE may be associated with both the PTM leg (e.g., operated in RLC UM mode) and the PTP leg (e.g., operated in RLC AM mode). In this case, the PDCP entity of the UE may be configured/ enabled/requested to transmit the PDCP status report no matter whether the PDCP entity is operated with the PTP leg and/or the PTM leg.

In some examples, the statusReportRequired IE may be associated with the PTM leg. In this case, the PDCP entity of the UE may be configured/enabled/requested to transmit the PDCP status report (e.g., based on the triggering events pre-configured to be associated with the PTM leg) only when the PDCP entity is operated with the (active) PTM leg. Moreover, the UE is not configured/enabled/requested to transmit the PDCP status report when the PDCP entity is operated with the (active) PTP leg.

In some examples, the statusReportRequired IE may be associated with the PTP leg. In this case, the PDCP entity of the UE may be configured/enabled/requested to transmit the PDCP status report (e.g., based on the triggering events pre-configured to be associated with the PTP leg) only when the PDCP entity is operated with the (active) PTP leg. Moreover, the UE is not configured/enabled/requested to transmit the PDCP status report when the PDCP entity is operated with the (active) PTM leg.

In some examples, two statusReportRequired IEs may be configured in the PDCP entity configuration and each statusReportRequired IE may be associated with each leg (e.g., the PTP/PTM leg) respectively. In a case that the PDCP entity is operated/associated with one (active) PTP leg, the PDCP entity of the UE may be configured/enabled/requested to transmit the PDCP status report when the statusReportRequired IE associated with PTP leg is 'true', and thus the PDCP entity of the UE may be triggered to transmit the PDCP status report when the triggering events associated with the PTP leg occur. In contrast, in a case that the PDCP entity is operated with one (active) PTM leg, the PDCP entity of the UE may be configured/enabled/requested to transmit the PDCP status report when the statusReportRequired IE associated with PTM leg is 'true', and thus the PDCP entity may be triggered to transmit the PDCP status report when the triggering events associated with the PTM leg occur.

In some examples, the PDCP entity of the UE may not be configured/enabled/requested to transmit the PDCP status report when the PDCP entity is operated with one active (PTP/PTM) leg and the statusReportRequireed IE associated with the active leg is absent or configured with false. In some implementations, one MRB-specific IE, MRB-statusReportRequired={PTM and/or PTP}, may be configured to indicate the leg configured/enabled/requested for the PDCP status report.

In some implementations, the PDCP entity of the UE may be associated with one RLC entity in the AM mode (e.g., RLC AM entity).

In some examples, if the PDCP entity of the UE is associated with one RLC entity, the PDCP entity may trigger the PDCP status report if the PDCP entity is associated with an RLC AM entity. Otherwise, the PDCP entity may not trigger the PDCP status report.

In some implementations, the PDCP entity of the UE may be associated with two RLC entities. One RLC entity is in the AM mode (e.g., RLC AM entity), and the other RLC entity is in the UM mode (e.g., RLC UM entity).

In some examples, if the PDCP entity of the UE is associated with two RLC entities, the PDCP entity may trigger the PDCP status report if the PDCP entity is associated with at least one RLC AM entity (e.g., one RLC AM entity and one RLC UM entity). Otherwise, the PDCP entity may not trigger the PDCP status report.

In some implementations, the PDCP entity of the UE may be associated with two RLC UM entities.

In some examples, if the PDCP entity of the UE is associated with two RLC entities, the PDCP entity may trigger the PDCP status report if both RLC entities are RLC UM entities. Otherwise, the PDCP entity may not trigger the PDCP status report.

In some implementations, the PDCP entity of the UE may be a specific type of PDCP entity (as defined below).

Condition 2: The (PDCP entity of the) UE receives, from the network, at least one of scheduling information and DL data (e.g., MAC PDU) via a different leg. For example, the UE (e.g., PDCP entity) may receive at least one of scheduling information and DL data via a first leg (e.g., PTM leg or PTP leg), and may later receive other scheduling information and DL data via a second leg (e.g., PTP leg or PTM leg) that is different form the first leg.

In some implementations, the UE may determine that the received scheduling information corresponds to a different leg according to a PDCCH/CORESET/SS configuration. The network may configure the PDCCH/CORESET/SS configuration for receiving the scheduling information that schedules a group-common PDSCH (e.g., the PTM leg) or a UE-specific PDSCH (e.g., the PTP leg).

In some examples, the UE may trigger a PDCP status report if the UE (successfully) receives the first scheduling information on the PDCCH/CORESET/SS configuration 1 and the previously received scheduling information is received on the PDCCH/CORESET/SS configuration 2.

The PDCP status report may be triggered by the PDCP entity of the UE.

The UE may be considered as successfully receiving the scheduling information if the UE successfully decodes the DL data scheduled by the scheduling information.

In some examples, the UE may be considered as successfully receiving the scheduling information if the UE transmits an ACK (e.g., HARQ-ACK) to the network. The ACK may be used to inform the network when the UE successfully receives the DL data scheduled by the scheduling information.

In some examples, the PDCCH/CORESET/SS configuration 1 may be configured for the reception of scheduling information that schedules a group-common PDSCH, and PDCCH/CORESET/SS configuration 2 may be configured for the reception of scheduling information that schedules a UE-specific PDCSH. In some examples, the PDCCH/CORESET/SS configuration 1 may be configured for the reception of scheduling information that schedules a UE-specific PDCSH, and PDCCH/CORESET/SS configuration 2 may be configured for the reception of scheduling information that schedules a group-common PDSCH.

The PDCCH/CORESET/SS configuration 1 may not be the same as the PDCCH/CORESET/SS configuration 2.

The previously received scheduling information may be referred to as the last scheduling information received before the first scheduling information.

In some implementations, the UE may determine that scheduling information is received via a different leg according to a HARQ process ID. The network may configure a group of one or multiple HARQ process IDs that is associated with the PTM leg and/or a group of one or multiple HARQ process IDs that is associated with the PTP leg.

In some examples, the UE may trigger a PDCP status report if the UE (successfully) receives the first scheduling information with the first HARQ process ID via a first leg, and the previously received scheduling information with the second HARQ process ID is received via a second leg.

The PDCP status report may be triggered by the PDCP entity of the UE.

The UE may be considered as successfully receiving the scheduling information if the UE successfully decodes the DL data scheduled by the scheduling information.

In some examples, the UE may be considered as successfully receiving the scheduling information if the UE transmits an ACK (e.g., HARQ-ACK) to the network. The ACK may be used to inform the network when the UE successfully receives the DL data scheduled by the scheduling information.

The first HARQ process ID may correspond to a first HARQ process ID group, and the second HARQ process ID may correspond to a second HARQ process ID group.

In some examples, a HARQ process from the first HARQ process ID group may be associated with the scheduling information that schedules a group-common PDSCH, and a HARQ process from the second HARQ process ID group may be associated with the scheduling information that schedules a UE-specific PDSCH. In some examples, a HARQ process from the first HARQ process ID group may be associated with the scheduling information that schedules a UE-specific PDSCH, and a HARQ process from the second HARQ process ID group may be associated with the scheduling information that schedules a group-common PDSCH.

The previously received scheduling information may be referred to as the last scheduling information received before the first scheduling information.

In some implementations, the UE may determine that scheduling information is received via a different leg based on whether the received scheduled information schedules a PDSCH for new transmission/retransmission. In this case, a leg switching is performed to receive a retransmission scheduling.

In some examples, the UE may receive the first scheduling information of the first HARQ process for new transmission. However, the UE may not successfully receive/decode the DL data scheduled by the first scheduling information. Subsequently, if the UE (successfully) receives the second scheduling information that schedules the DL data for a retransmission of the first HARQ process, the UE may trigger a PDCP status report.

The PDCP status report may be triggered by the PDCP entity of the UE.

The UE may be considered as successfully receiving the scheduling information if the UE successfully decodes the DL data scheduled by the scheduling information.

In some examples, the UE may be considered as successfully receiving the scheduling information if the UE transmits an ACK (e.g., HARQ-ACK) to the network. The ACK may be used to inform the network upon successful reception of the DL data scheduled by the scheduling information.

The first scheduling information for a new transmission may be associated with the C-RNTI to schedule a group-common PDSCH (e.g., the PTM leg), and the second scheduling information for a retransmission may be associated with the C-RNTI to schedule a UE-specific PDSCH (e.g., the PTP leg).

In some implementations, the PDCP status report may be triggered if the scheduling information that corresponds to a different leg schedules a PDSCH, and a MAC PDU transmitted on the PDSCH includes the DL data that corresponds to the same MBS as the radio bearer (e.g., MRB) that the PDCP entity is associated with.

In some implementations, the PDCP status report may be triggered if the scheduling information that corresponds to a different leg is associated with an RNTI (e.g., G-RNTI), and the RNTI (e.g., G-RNTI) is mapped to the same service as the radio bearer that the PDCP entity is associated with.

In some implementations, the PDCP status report may be triggered if the UE receives the scheduling information that corresponds to a PTP leg, and the previously received scheduling information corresponds to a PTM leg.

In some implementations, a lower layer (e.g., the PHY layer, the MAC layer, the RLC layer (associated with the PDCP entity)) of the UE may inform the PDCP entity of the UE by sending a triggering indication/instance when the UE receives the scheduling information that corresponds to a different leg. As such, the PDCP status report may be triggered, by the PDCP entity of the UE, when the PDCP entity is indicated by the lower layer of the UE.

The trigger indication/instance may indicate that the PDCP entity needs to trigger a PDCP status report.

In some implementations, a higher layer (e.g., the RRC layer) of the UE may inform the PDCP entity of the UE by sending a triggering indication/instance, when the UE receives the scheduling information that corresponds to a different leg. As such, the PDCP status report may be triggered, by the PDCP entity of the UE, when the PDCP entity is indicated by the higher layer of the UE.

The trigger indication/instance may indicate that the PDCP entity needs to trigger a PDCP status report.

In some implementations, the PDCP status report may triggered by the PDCP entity of the UE when:

The UE receives the scheduling information that corresponds to a different leg.

The UE successfully receives/decodes the DL data (e.g., MAC PDU) scheduled by the scheduling information.

The UE transmits a (HARQ) feedback in response to the received scheduling information that corresponds to a different leg. The feedback may be an HARQ ACK/NACK.

In some implementations, a lower layer (e.g., the PHY layer or the MAC layer) of the UE may send a triggering indication/instance to the PDCP entity of the UE when:

The UE receives the scheduling information on a different location (and receives/decodes the DL data scheduled by this scheduling information). For example, the UE (e.g., PDCP entity) receives at least one of scheduling information and DL data via a first location corresponding to a first leg (e.g., PTM leg or PTP leg), but receives other scheduling information and DL data via a second location corresponding to a second leg (e.g., PTP leg or PTM leg) later on.

The UE transmits a (HARQ) feedback in response to the received scheduling information that corresponds to a different leg. The feedback may be a HARQ ACK/NACK.

Condition 3: The PDCP entity of the UE receives a dynamic switching indication from the network.

In some implementations, the dynamic switching indication may be referred to as an RRC reconfiguration message that indicates a change of MRB type. There are various MRB types. Some exemplary MRB types are described below:

MRB type 1: An MRB associated with a PDCP entity and one RLC UM entity for PTP transmission.

MRB type 2: An MRB associated with a PDCP entity and one RLC AM entity for PTP transmission.

MRB type 3: An MRB associated with a PDCP entity and one RLC UM entity for PTM transmission.

MRB type 4: An MRB associated with a PDCP entity, one RLC UM entity for PTM transmission, and one RLC AM entity for PTP transmission.

MRB type 5: An MRB associated with a PDCP entity, one RLC UM entity for PTM transmission, and one RLC UM entity for PTP transmission.

In some examples, a PDCP entity of a UE may trigger a PDCP status report upon reception of an RRC reconfiguration message that indicates a change of MRB type for the corresponding PDCP entity. Preferably, the PDCP entity may trigger a PDCP status report if the PDCP entity is associated with at least one RLC AM entity after the MRB type change (e.g., the PDCP entity corresponds to MRB type 2, MRB type 4, or MRB type 5 after the MRB type change). Preferably, the PDCP entity may not trigger a PDCP status report if the PDCP entity is not associated with at least one RLC AM entity after the MRB type change (e.g., the PDCP entity corresponds to MRB type 1 or MRB type 3 after the MRB type change).

In some implementations, the UE may trigger a PDCP status report if the UE receives a dynamic switching indication that indicates a switching from the PTM leg to the PTP leg (or from the PTP leg to the PTM leg).

In some examples, when the UE receives a dynamic switching indication, the UE may determine whether to trigger a PDCP status report based on the content of the dynamic switching indication. When the dynamic switching indication indicates to the UE to switch from the PTM leg to the PTP leg (and the PTP leg corresponds to an RLC AM entity), the UE may trigger a PDCP status report. In contrast, when the dynamic switching indication indicates to the UE to switch from the PTP leg to the PTM leg, the UE may not trigger a PDCP status report.

In some examples, when the UE receives a dynamic switching indication, the UE may determine whether to trigger a PDCP status report based on the content of the dynamic switching indication. The UE may trigger a PDCP status report when the dynamic switching indication indicates to the UE to switch to a PTP leg corresponding to an RLC AM entity. The UE may trigger a PDCP status report when the dynamic switching indication indicates to the UE to switch to a PTM leg and a PTP leg corresponding to an RLC AM entity. The UE may not trigger a PDCP status report when the dynamic switching indication indicates to the UE to switch to a PTP leg that corresponds to an RLC UM entity. The UE may not trigger a PDCP status report when the dynamic switching indication indicates to the UE to switch to a PTM leg. The UE may not trigger a PDCP status report when the dynamic switching indication indicates to the UE to switch to a PTM leg and a PTP leg corresponding to an RLC UM entity.

In some implementations, the PDCP status report may be triggered by the PDCP entity of the UE if the received dynamic switching indication corresponds to the PDCP entity. Moreover, the received dynamic switching indication corresponds to the PDCP entity if at least one of the following criteria is satisfied:

The dynamic switching indication may indicate the identity of the radio bearer (e.g., DRB ID/MRB ID) that the PDCP entity corresponds to. For example, the dynamic switching indication may include the identity of the radio bearer (e.g., DRB ID/MRB ID) of the PDCP entity.

The dynamic switching indication may indicate the identity of the LCH (e.g., LogicalChannelIdentity) that maps to the PDCP entity.

The RNTI (e.g., G-RNTI) associated with (e.g., CRC scrambled by) the dynamic switching indication is mapped to the same MBS as the MRB that the PDCP entity corresponds to. For example, the G-RNTI associated with the dynamic switching indication is mapped to the same MBS session as the MRB that the PDCP entity corresponds to.

In some implementations, when the UE receives the dynamic switching indication, the lower layer (e.g., the PHY layer, the MAC layer, the RLC layer (associated with the PDCP entity)) or the higher layer (e.g., RRC layer) of the UE may inform the PDCP entity of the UE by sending a triggering indication/instance. This may depend on the layer that the dynamic switching indication is from (e.g., DCI, MAC CE, RRC message, etc.). As such, the PDCP status report may be triggered, by the PDCP entity, when the PDCP entity is indicated by the lower layer or higher layer of the UE.

The trigger indication/instance may indicate that the PDCP entity needs to trigger a PDCP status report.

Condition 4: The UE starts monitoring a new leg of the PDCP entity and/or stops monitoring an old leg of the PDCP entity.

In some implementations, the UE may be determined to start monitoring a new leg of the PDCP entity if at least one of the following criteria (e.g., from Criteria 1 through Criteria 3) is satisfied:

Criteria 1: The UE starts monitoring scheduling information for an RNTI, the scheduling information being associated with a leg of the PDCP entity and being currently not monitored.

Criteria 2: The UE starts monitoring on a PDCCH/CORESET/SS configuration that is associated with a leg of the PDCP entity and is currently not monitored.

Criteria 3: The UE starts monitoring on a different location that is associated with a leg of the PDCP entity and is currently not monitored. In this case, the different location may be referred to as an MBS common frequency resource, a BWP, and/or a serving cell.

In some implementations, the UE may be determined to stop monitoring at an old leg of the PDCP entity if at least one of the following criteria (e.g., from Criteria 4 through Criteria 6) is satisfied:

Criteria 4: The UE stops monitoring scheduling information for an RNTI, the scheduling information being associated with a leg of the PDCP entity and being currently monitored.

Criteria 5: The UE stops monitoring on a PDCCH/CORESET/SS configuration that is associated with a leg of the PDCP entity and is currently monitored.

Criteria 6: The UE stops monitoring on a location that is associated with a leg of the PDCP entity and is currently monitored.

In some implementations, the UE may start monitoring at a new leg of the PDCP entity and/or stop monitoring at an old leg of the PDCP entity if at least one of the following is satisfied:

The UE fails to receive/decode the DL data that corresponds to the old leg.

The UE receives a dynamic switching indication from the network. For example, the UE may receive a dynamic switching indication that indicates to the UE to receive MBS data on the indicated leg (e.g., the new leg), not on the previously indicated leg (e.g., the old leg).

The UE receives a reconfiguration/command/instruction to release the previously indicated leg (e.g., the old leg).

The UE receives a reconfiguration/command/instruction to setup/establish the indicated leg (e.g., the new leg).

In some implementations, the PDCP status report may be triggered by the PDCP entity of the UE when at least one of the criteria listed above (e.g., from Criteria 1 through Criteria 6) is satisfied.

In some examples, the UE may be configured with a C-RNTI and one or multiple G-RNTIs. In some examples, if the UE has started monitoring for the scheduling information associated with the one or multiple G-RNTIs and has not started monitoring for the scheduling information associated with the C-RNTI, the UE may determine to trigger a PDCP status report when the UE starts monitoring for the scheduling information associated with the C-RNTI and/or stops monitoring for the scheduling information associated with the G-RNTI.

In some examples, the C-RNTI and the one or multiple G-RNTIs may correspond to a radio bearer (e.g., an MRB), and the radio bearer may correspond to a PDCP entity.

In some examples, the C-RNTI may be associated with the PTP leg of the PDCP entity, and the one or multiple G-RNTIs may be associated with the PTM leg of the PDCP entity. In some examples, the one or multiple G-RNTIs may be used to schedule a (group-common) PDSCH for a transmission of data from the radio bearer (e.g., the MRB).

In some examples, if the UE has started monitoring for the scheduling information associated with the one or multiple G-RNTIs and has not started monitoring for the scheduling information associated with the C-RNTI, the PDCP entity of the UE may determine to trigger a PDCP status report when the UE starts monitoring for the scheduling information associated with the C-RNTI and/or when the UE stops monitoring for the scheduling information associated with the G-RNTI.

In some examples, the scheduling information may be used to schedule a PDSCH for MBS data transmission.

In some examples, the C-RNTI may be received specifically at a PDCCH/CORESET/SS configuration for monitoring scheduling information that schedules a group-common PDSCH. Alternatively, the scheduling information associated with the C-RNTI may be specifically for scheduling MBS data.

In some examples, the UE may be configured with a first PDCCH/CORESET/SS configuration for monitoring scheduling information that schedules a group-common PDSCH, and a second PDCCH/CORESET/SS configuration for monitoring scheduling information that schedules a UE-specific PDSCH. In some examples, if the UE has started monitoring on the first PDCCH/CORESET/SS configuration and has not started monitoring on the second PDCCH/CORESET/SS configuration, the UE may determine to trigger a PDCP status report when the UE starts monitoring on the second PDCCH/CORESET/SS configuration and/or when the UE stops monitoring on the first PDCCH/CORESET/SS configuration.

In some examples, the first/second PDCCH/CORESET/SS configuration may correspond to a radio bearer (e.g., an MRB), and the radio bearer may correspond to a PDCP entity.

In some examples, if the UE has started monitoring on the first PDCCH/CORESET/SS configuration and has not started monitoring on the second PDCCH/CORESET/SS configuration, the PDCP entity of the UE may determine to trigger a PDCP status report when the UE starts monitoring on the second PDCCH/CORESET/SS configuration and/or when the UE stops monitoring on the first PDCCH/CORESET/SS configuration.

In some examples, the scheduling information associated with G-RNTI and/or C-RNTI may be received on the first PDCCH/CORESET/SS configuration. Moreover, the scheduling information associated with C-RNTI may be received on the second PDCCH/CORESET/SS configuration.

In some examples, the group-common PDSCH and/or the UE-specific PDSCH may be used for MBS data transmission.

In some examples, the UE may be configured with a first location (e.g., a first MBS common frequency resource/BWP/serving cell) for monitoring a group-common PDSCH for MBS data transmission, and a second location (e.g., a second MBS common frequency resource/BWP/serving cell) for monitoring a UE-specific PDSCH. In some examples, if the UE has started monitoring on the first location and has not started monitoring on the second location, the UE may determine to trigger a PDCP status report when the UE starts monitoring on the second location and/or when the UE stops monitoring on the first location.

In some examples, the first/second location may correspond to a radio bearer (e.g., an MRB), and the radio bearer may correspond to a PDCP entity.

In some examples, if the UE has started monitoring on the first location and has not started monitoring on the second location, the PDCP entity of the UE may determine to trigger a PDCP status report when the UE starts monitoring on the second location and/or when the UE stops monitoring on the first location.

In some examples, the group-common PDSCH and/or the UE specific PDSCH may be used for MBS data transmission.

Condition 5: The PDCP entity of the UE has been reconfigured.

In some implementations, the PDCP entity of the UE may be reconfigured by the network via an RRC message (e.g., RRCReconfiguration message).

The RRC message reconfigures the PDCP parameters for a radio bearer of the PDCP entity (e.g., reconfigure the PDCP-Config IE of the PDCP entity).

The RRC message may reconfigure the RLC entity/LCH parameters that are associated with the PDCP entity.

In some implementations, the PDCP entity may be associated with one leg (e.g., one RLC entity/LCH) before being reconfigured by the network via an RRC message.

For example, the radio bearer (e.g., MRB) that is associated with the PDCP entity may be associated with one RLC entity/LCH.

For example, the IE that configures the PDCP parameters for radio bearer of the PDCP entity (e.g., PDCP-Config IE of the (receiving) PDCP entity) may not include a moreThanOneRLC IE.

In some implementations, after the PDCP entity is reconfigured, the PDCP entity may be associated with a new leg (e.g., a new RLC entity/LCH that is associated with the radio bearer of the PDCP entity). An rlc-BearerToAddModList IE may be used to associate a new leg with the PDCP entity.

In some implementations, after the PDCP entity is reconfigured, the old leg that is associated with the PDCP entity (e.g., the RLC entity/LCH that is already associated with the radio bearer of the PDCP entity) may be released/cleared. An rlc-BearerToReleaseList IE may be used to release/clear the old leg that is associated with the PDCP entity.

In some implementations, the UE may be configured with a PDCP entity. Subsequently, the PDCP entity of the UE may trigger a PDCP status report after the UE receives, from the network, an RRC message (e.g., RRCReconfiguration message) for reconfiguring the PDCP entity.

In some examples, the PDCP entity of the UE may trigger a PDCP status report only if the PDCP entity is associated with one leg (e.g., one RLC entity/LCH) before the UE receives the RRC message.

In some examples, the PDCP entity of the UE may trigger a PDCP status report only if the RRC message includes an IE that associates a new leg with the PDCP entity (e.g., rlc-BearerToAddModList IE) and/or includes an IE to release/clear the old leg that is associated with the PDCP entity (e.g., rlc-BearerToReleaseList IE). Moreover, the old leg may be a PTM leg and the new leg may be a PTP leg.

In some examples, the PDCP status report is triggered after the UE finishes the RRC reconfiguration procedure corresponding to the received RRCReconfiguration message.

In some implementations, the PDCP entity associated with the MRB may be configured with or may have different triggering events of PDCP status reports for the MRB corresponding to the PTM leg and/or PTP leg. Triggering events for the PDCP status report by the PDCP entity are illustrated in Table 4A. In Table 4A, different triggering events are configured to be associated with the PDCP entity when the PDCP entity connects with a different active leg. In Table 4A, the PDCP entity of the MRB may trigger the PDCP status report when at least one of the events below has been satisfied.

TABLE 4A

| Leg | Triggering events for PDCP status report |
|---|---|
| MRB with PTP leg (or a leg configured with RLC AM mode) | (Event 1) Any combination of the proposed Condition 1~5.<br>(Event 2) the upper layer requests a PDCP entity re-establishment for the PDCP entity of the concerned MRB.<br>Preferably, the upper layer (e.g., RRC layer) of the UE may request a PDCP re-establishment for the PDCP entity upon reception of an RRC Reconfiguration message from the network. Moreover, the RRC Reconfiguration message may include the MRB configuration of the concerned MRB (e.g., the MRB configuration of the concerned MRB may be included in an MBS-RB-ToAddMod IE). The MRB configuration of the concerned MRB may include a specific IE (e.g., a reestablishPDCP IE) with a specific value (e.g., a value TRUE) for indicating a PDCP reestablishment for the PDCP entity of the MRB. The PDCP-Config of the PDCP entity may be included in the same MRB configuration of the concerned MRB. Here, the RRC Reconfiguration message may also include information to indicate the MRB type change. The PDCP entity of the UE may trigger a PDCP status report when the RRC reconfiguration message indicates both data recovery of the PDCP entity and the MRB type change for the MRB that corresponds to the PDCP entity.<br>(Event 3) the upper layer requests a PDCP data recovery procedure for the PDCP entity of the concerned MRB.<br>Preferably, the upper layer (e.g., RRC layer) of the UE may request a PDCP entity data recovery for the PDCP entity upon reception of an RRC Reconfiguration message from the netwrok. Moreover, the RRC Reconfiguration message may include the MRB configuration of the concerned MRB (e.g., the MRB configuration of the concerned MRB may be included in an MBS-RB-ToAddMod IE). The MRB configuration of the concerned MRB may include a specific IE (e.g., a recoverPDCP IE) with a specific value (e.g., a value TRUE) for indicating a PDCP data recovery procedure for the PDCP entity of the MRB. The PDCP-Config of the PDCP entity may be included in the same MRB configuration of the concerned MRB. Here, the RRC Reconfiguration message may also include information to indicate the MRB type change. The PDCP entity of the UE may trigger a PDCP status report when the RRC reconfiguration message indicates both data recovery of the PDCP entity and MRB type change for the MRB that corresponds to the PDCP entity.<br>(Event 4) the upper layer re-configures the PDCP entity (of the concerned MRB)<br>Preferably, the upper layer may reconfigure the PDCP entity to release the Dual Active Protocol Stack (DAPS) and daps-sourceRelease is configured in the RRC signaling to be associated with the concerned MRB.<br>(Event 5) the upper layer requests an uplink data switching. (In some implementations, the MRB may or may not be configured with uplink data transmission. In some implementations, the PDCP control PDU or other control PDU may be considered as part of uplink data).<br>In some implementations, Events 2~4 may not be configured with the PTP leg (Events 2~5 are applicable triggering events to a DRB in RLC AM mode). In some conditions, the upper layer may not request a PDCP entity to perform the PDCP entity re-establishment procedure, the upper layer may not request a PDCP entity to perform the PDCP data recovery procedure, the upper layer may not request a PDCP entity to perform the uplink data switching, or the upper layer may not request a PDCP entity to release the DAPS.<br>It Is noted that the triggering events as previously mentioned may not only be applicable to a PTP leg but also applicable to a (active) leg configured with RLC AM mode associated with the PDCP entity. |

TABLE 4A-continued

| Leg | Triggering events for PDCP status report |
|---|---|
| MRB with PTM leg (or a leg configured with RLC UM mode) | (Event A) Any combination of the proposed Condition 1~5.<br>(Event B) the upper layer requests an uplink data switching. (In some implementations, the MRB may or may not be configured with uplink data transmission. In some implementations, the PDCP control PDU or other control PDU may be considered as part of uplink data).<br>In some implementations, Event B may not be configured with the PTM leg (Event B is an applicable triggering event to a DRB in RLC UM mode). In some conditions, the upper layer may not request a PDCP entity to perform the uplink data switching.<br>It should be noted that the triggering events as previously mentioned may not only be applicable to a PTM leg but also applicable to a (active) leg configured with RLC UM mode associated with the PDCP entity. |
| | Based on the different triggering events (pre-)configured for different active legs (e.g., the PTP leg or the PTM leg) respectively, the PDCP entity may trigger a PDCP status report when the PDCP entity is associated with different active (PTP/PTM) legs.<br>Please also note, the proposed triggering events in Table 4A may be pre-defined in the 3GPP technical specifications or be configured via the UE-specific dedicated control signaling (e.g., within the PDCP configuration associated with the concerned MRB) or via the broadcasting system information (e.g., through MBS-SIB).<br>In some implementations, one PDCP entity may stop/interrupt /release the PDCP status report procedure (e.g., drop a PDCP status report) when the upper layer instructs the PDCP entity to switch its active leg (e.g., switched from the PTM leg to the PTP leg or from the PTP leg to the PTM leg). For example, when the PDCP entity switches its active leg from the PTP leg to the PTM leg (Based on the request/configuration of the upper layer, such as the RRC layer or the RRC entity of the UE), the PDCP status report associated with the MRB may not be transmitted to the lower layer (in addition, the PDCP status report may be dropped by the PDCP entity or by the lower layer based on the requirement from the PDCP entity or based on the requirement of the RRC entity). In some implementations, the PDCP staus report (associated with the MRB) transmission procedure may not be interrupted by the dynamic switching indication (from the upper layer). Thus, the PDCP entity of the concerned MRB may keep the PDCP status report generation and transmission procedure even if the active leg of the concerned MRB changes. |

Transmitting the Compiled PDCP Status Report to the Lower Layer

In some implementations, the PDCP entity of the UE may be associated with a radio bearer (e.g., MRB). Moreover, if the PDCP entity of the UE determines to trigger a PDCP status report due to at least one of the conditions (e.g., from Condition 1 through Condition 5) as previously mentioned being satisfied, the PDCP entity of the UE may compile a PDCP status report. Subsequently, the compiled PDCP status report may be transmitted, by the PDCP entity, to the lower layers of the UE.

In some implementations, when the PDCP entity of the UE needs to transmit a PDCP control PDU (e.g., a PDCP status report) to the lower layers of the UE, the PDCP entity of the UE may determine whether the PDCP control PDU (e.g., the PDCP status report) is triggered due to at least one of the conditions (e.g., from Condition 1 through Condition 5) as previously mentioned being satisfied. If so, the PDCP entity may always transmit the PDCP control PDU (e.g., the PDCP status report) to a specific type of RLC entity that associates to the PDCP entity.

In some examples, the PDCP entity may transmit the PDCP control PDU (e.g., the PDCP status report) to the specific type of RLC entity if the PDCP entity corresponds to a specific type of PDCP entity.

In some examples, the PDCP entity may not transmit the PDCP control PDU (e.g., the PDCP status report) to the specific type of RLC entity if the PDCP entity does not correspond to a specific type of PDCP entity. In this case, the PDCP entity may determine which RLC entity that the PDCP control PDU (e.g., the PDCP status report) should be transmitted to.

In some examples, the PDCP entity may not transmit the PDCP control PDU (e.g., the PDCP status report) to the specific type of RLC entity if the PDCP entity does not trigger the PDCP status report due to at least one of the conditions (e.g., from Condition 1 through Condition 5) as previously mentioned. In this case, the PDCP entity may determine which RLC entity that the PDCP control PDU (e.g., the PDCP status report) should be transmitted to.

In some examples, the network may configure the association between the PDCP entity and the RLC entity, via an RRC message. To associate the PDCP entity with the RLC entity, the network may associate the PDCP entity and the RLC entity with the same radio bearer (e.g., MRB). For example, the PDCP entity and the RLC entity may be associated with the same radio bearer identity (e.g., DRB-Identity, SRB-Identity, or MRB identity).

The network may associate a PDCP entity with a radio bearer by including the IE that configures PDCP parameters (e.g., PDCP-Config IE) of the PDCP entity in the IE that is used to add a radio bearer (e.g., DRB-ToAddMod IE).

The network may associate an RLC entity with a radio bearer by including the radio bearer identity of the radio bearer in the IE that configures the RLC entity (e.g., RLC-BearerConfig IE).

In some implementations, if the network needs to configure, for a UE, a specific type of PDCP entity with more than one associated RLC entity (e.g., 2 RLC entities), the network may always configure the primary path/primary RLC entity to an RLC entity that corresponds to a specific type of RLC entity. As such, the PDCP control PDU (e.g., PDCP status report) may be transmitted to the specific type of RLC entity when certain conditions are satisfied.

In some examples, certain conditions may be:
PDCP duplication is activated.
PDCP duplication is deactivated and split secondary RLC entity is not configured.

PDCP duplication is deactivated, and the PDCP entity is not associated with the DAPS bearer.

In some examples, the network may configure the primary RLC entity to the specific type of RLC entity by indicating the LCD (e.g., LogicalChannelIdentity IE) and/or cell group ID (e.g., CellGroupId IE) of the specific type of RLC entity in the IE that configures the primary path/primary RLC entity (e.g., primaryPath IE).

In some implementations, the PDCP duplication function may not be activated/configured by the network for a PDCP entity associated with more than one RLC entity if the PDCP entity corresponds to a specific type of PDCP entity and/or at least one of the associated RLC entities corresponds to a specific type of RLC entity.

In some implementations, a specific type of the RLC entity may have at least one of the following characteristics:
  The specific type of the RLC entity may be an RLC AM entity.
  The specific type of the RLC entity may be an RLC UM entity.
  The specific type of the RLC entity may correspond to/be a PTP leg.
  The specific type of the RLC entity may correspond to/be a PTM leg.
  The specific type of the RLC entity may be identified, by the UE, based on whether a specific IE is included in the IE that configures the RLC entity (e.g., RLC-BearerConfig IE in Table 5 illustrating an IE that is used for identifying a specific type of RLC entity). If the specific IE (e.g., specific-RLC IE in Table 5) is presented (with a specific value), the corresponding RLC entity may be regarded as a specific type of RLC entity. In contrast, if the specific IE is not presented (with a specific value), the corresponding RLC entity may not be regarded as a specific type of RLC entity.

TABLE 5

```
-- ASN1START
-- TAG-RLC-BEARERCONFIG-START
RLC-BearerConfig ::=      SEQUENCE {
   specific-RLC            ENUMERATED { true }
}
-- TAG-RLC-BEARERCONFIG-STOP
-- ASN1STOP
```

In some implementations, a specific type of the PDCP entity may have at least one of the following characteristics:
  The specific type of the PDCP entity may be associated with an MRB.
  The specific type of the PDCP entity may be associated with one AM RLC entity and one UM RLC entity.
  The specific type of the PDCP entity may be identified, by the UE, based on whether a specific IE is included in the IE that configures the PDCP parameters of the specific type of PDCP entity (e.g., PDCP-Config IE in Table 6 illustrating an IE that is used for identifying a specific type of PDCP entity). If the specific IE (e.g., specific-PDCP IE in Table 6) is presented (with a specific value), the corresponding PDCP entity may be regarded as a specific type of PDCP entity. In contrast, if the specific IE is not presented (with a specific value), the corresponding PDCP entity may not be regarded as a specific type of the PDCP entity.

TABLE 6

```
-- ASN1START
-- TAG-RLC-BEARERCONFIG-START
PDCP-Config ::=      SEQUENCE {
```

TABLE 6-continued

```
   specific-PDCP           ENUMERATED { true }
}
-- TAG-RLC-BEARERCONFIG-STOP
-- ASN1STOP
```

Figure 5:
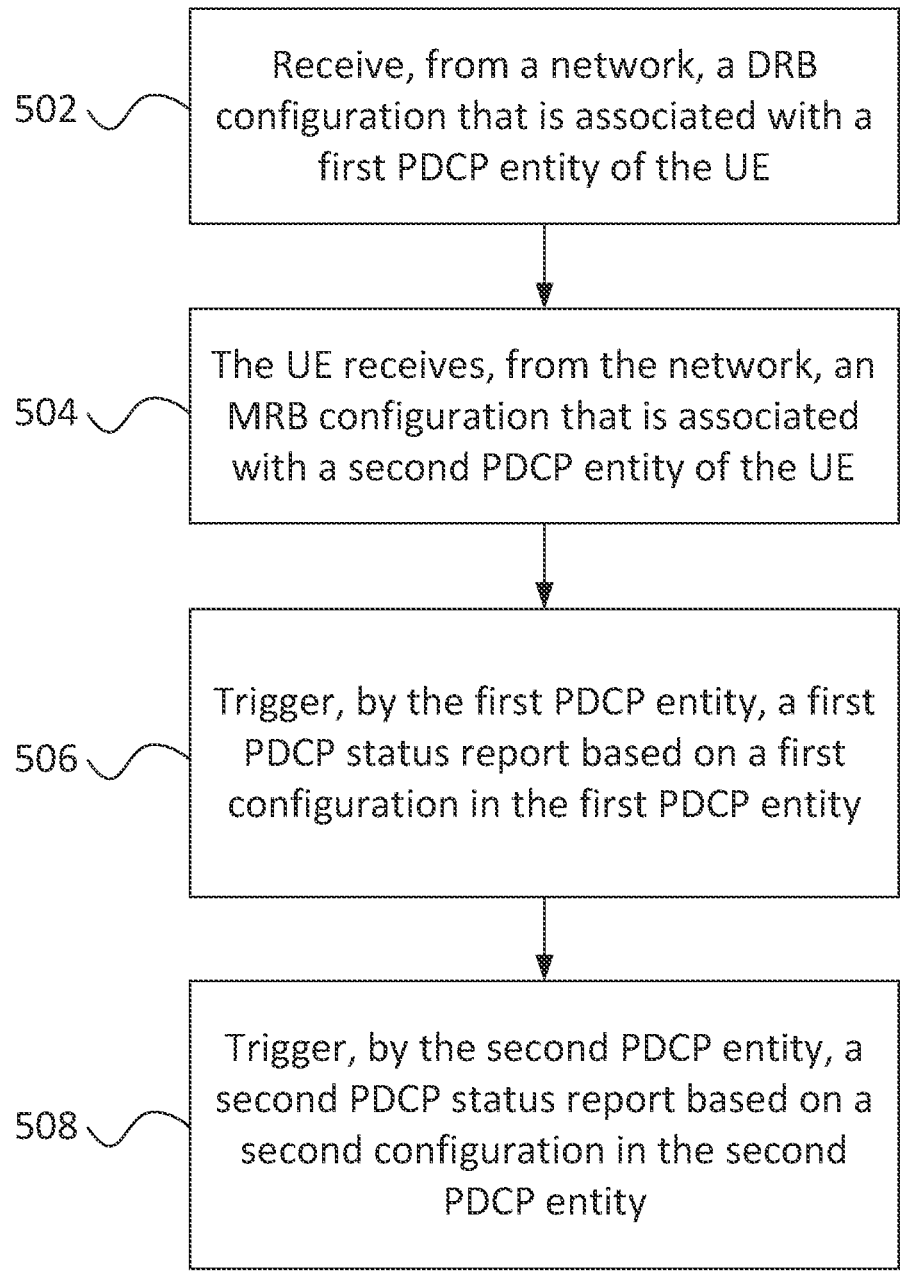
FIG. 5 is a flowchart illustrating a method/process for triggering a PDCP status report, according to an implementation of the present disclosure.

FIG. 5 is a flowchart illustrating a method 500 for triggering a PDCP status report, according to an implementation of the present disclosure. In action 502, the UE receives, from a network, a DRB configuration that is associated with a first PDCP entity of the UE. In action 504, the UE receives, from the network, an MRB configuration that is associated with a second PDCP entity of the UE. In action 506, the UE triggers, by the first PDCP entity, a first PDCP status report based on a first configuration in the first PDCP entity. In action 508, the UE triggers, by the second PDCP entity, a second PDCP status report based on a second configuration in the second PDCP entity.

Based on the method 500, the UE independently triggers the first PDCP status report for the DRB configuration and the second PDCP status report for the MRB configuration.

In some examples, the UE triggers, by the first PDCP entity, the first PDCP status report based on the first configuration in the first PDCP entity when the UE receives, from the network, a first RRC reconfiguration message. The first RRC reconfiguration message is used for reconfiguring the first PDCP entity and indicates at least one of PDCP entity re-establishment and PDCP data recovery of the first PDCP entity.

In some examples, the UE triggers, by the second PDCP entity, the second PDCP status report based on the second configuration in the second PDCP entity when the UE receives, from the network, a second RRC reconfiguration message. The second RRC reconfiguration message is used for reconfiguring the second PDCP entity.

In some examples, the second RRC reconfiguration message indicates at least one of PDCP entity re-establishment and PDCP data recovery of the second PDCP entity. Thus, when the second PDCP entity of the UE receives the second RRC reconfiguration message for reconfiguring the second PDCP entity (e.g., PDCP entity re-establishment and PDCP data recovery), the second PDCP entity of the UE triggers the second PDCP status report.

In some examples, the second RRC reconfiguration message indicates at least one of adding (e.g., a new leg), releasing (e.g., an old leg), and modifying the second PDCP entity. Thus, when the second PDCP entity of the UE receives the second RRC reconfiguration message for reconfiguring the second PDCP entity (e.g., adding, releasing, and/or modifying the second PDCP entity), the second PDCP entity of the UE triggers the second PDCP status report.

In some examples, the second RRC reconfiguration message indicates the second PDCP entity to switch a transmission scheme of the MRB configuration between a PTP transmission scheme and a PTM transmission scheme.

In some examples, the second PDCP entity of the UE triggers the second PDCP status report when the second PDCP entity of the UE receives the second RRC reconfiguration message and receives, from the network, an IE (e.g., statusReportRequired IE) indicating that the second PDCP entity is configured to trigger the second PDCP status report.

In some examples, the second PDCP entity is associated with at least one RLC AM entity.

In some examples, the second PDCP entity is associated with the at least one RLC AM entity and an RLC UM entity.

Figure 6:
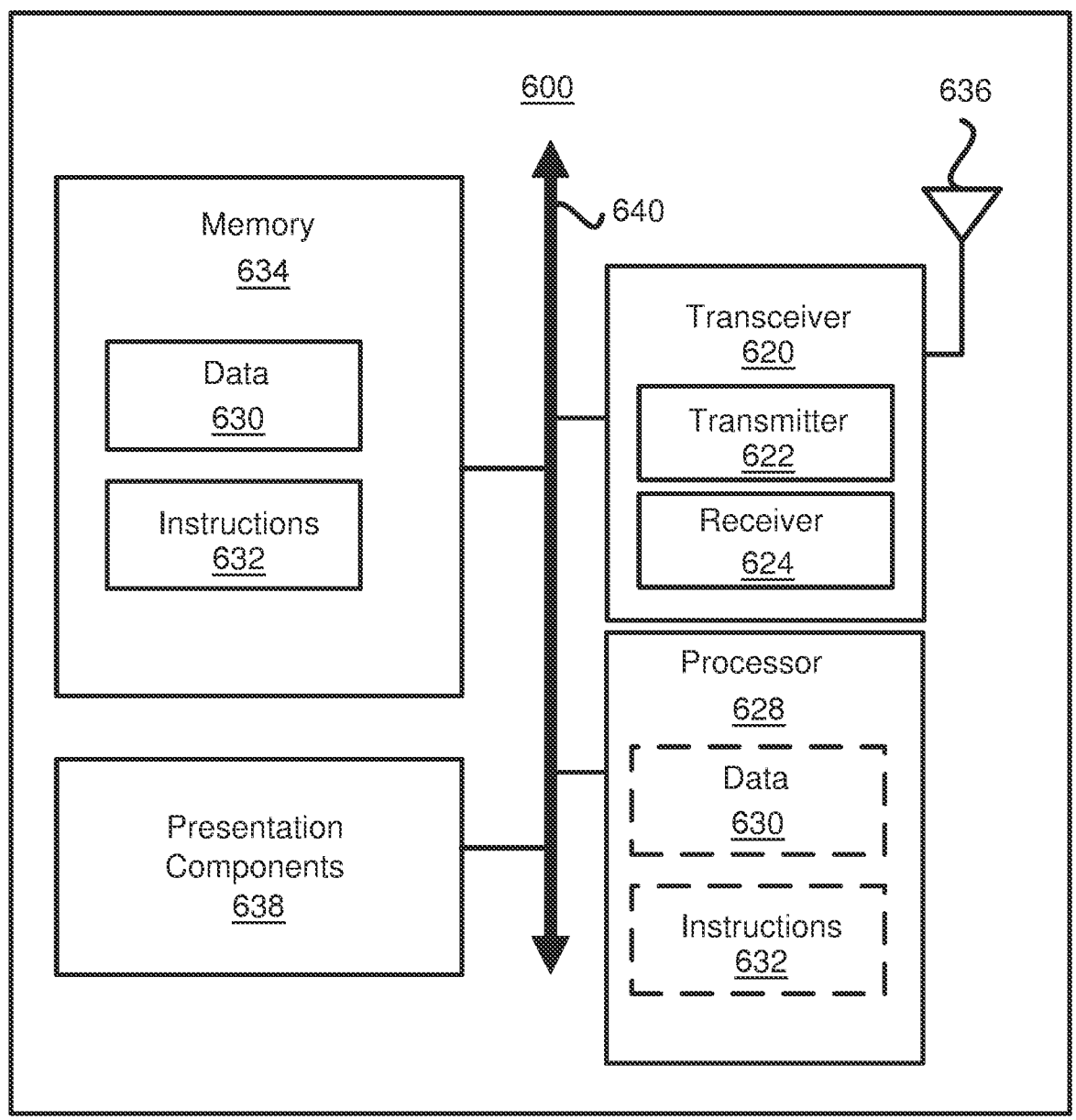
FIG. 6 is a block diagram illustrating a node for wireless communication, according to an implementation of the present disclosure.

FIG. 6 is a block diagram illustrating a node 600 for wireless communication, according to an implementation of the present disclosure.

As illustrated in FIG. 6, the node 600 may include a transceiver 620, a processor 626, a memory 628, one or more presentation components 634, and at least one antenna 636. The node 600 may also include a Radio Frequency (RF) spectrum band module, a BS communications module, a network communications module, a system communications management module, input/output (I/O) ports, I/O components, and a power supply (not illustrated in FIG. 6).

Each of these components may be in communication with each other, directly or indirectly, over one or more buses 640. The node 600 may be a UE or a BS that performs various disclosed functions illustrated in FIG. 5 and examples/implementations in this disclosure.

The transceiver 620 may include a transmitter 622 (with transmitting circuitry) and a receiver 624 (with receiving circuitry) and may be configured to transmit and/or receive time and/or frequency resource partitioning information. The transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media may be any media that can be accessed by the node 600 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the disclosed media should be included within the scope of computer-readable media.

The memory 634 may include computer-storage media in the form of volatile and/or non-volatile memory. The memory 634 may be removable, non-removable, or a combination thereof. For example, the memory 634 may include solid-state memory, hard drives, optical-disc drives, etc. As illustrated in FIG. 6, the memory 634 may store computer-readable and/or computer-executable instructions 632 (e.g., software codes) that are configured to, when executed, cause the processor 628 (e.g., processing circuitry) to perform various disclosed functions. Alternatively, the instructions 632 may not be directly executable by the processor 628 but may be configured to cause the node 600 (e.g., when compiled and executed) to perform various disclosed functions.

The processor 628 may include an intelligent hardware device, a central processing unit (CPU), a microcontroller, an ASIC, etc. The processor 628 may include memory. The processor 628 may process the data 630 and the instructions 632 received from the memory 634, and information received through the transceiver 620, the baseband communications module, and/or the network communications module. The processor 626 may also process information sent to the transceiver 620 for transmission via the antenna 636, and/or to the network communications module for transmission to a CN.

One or more presentation components 638 may present data to a person or other devices. Presentation components 638 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of triggering a packet data convergence protocol (PDCP) status report performed by a user equipment (UE), the method comprising:
    receiving, from a network, a Data Radio Bearer (DRB) configuration for configuring a DRB that is associated with a first PDCP entity of the UE;
    receiving, from the network, a Multicast Broadcast Service Radio Bearer (MRB) configuration for configuring an MRB that is associated with a second PDCP entity of the UE;
    triggering, by the first PDCP entity, a first PDCP status report based on a first configuration of the first PDCP entity;
    receiving, from the network, an information element (IE) indicating that the second PDCP entity is configured to trigger a second PDCP status report; and
    triggering, by the second PDCP entity, the second PDCP status report upon receiving, from the network, the IE and a first Radio Resource Control (RRC) reconfiguration message for a second configuration of the second PDCP entity, wherein:
    the first RRC reconfiguration message is used for reconfiguring the second PDCP entity and indicates at least one of PDCP entity re-establishment and PDCP data recovery of the second PDCP entity.

2. The method of claim 1, wherein:
    triggering, by the first PDCP entity, the first PDCP status report comprises triggering the first PDCP status report when the UE receives, from the network, a second Radio Resource Control (RRC) reconfiguration message for the first configuration of the first PDCP entity, and the second RRC reconfiguration message is used for reconfiguring the first PDCP entity, and indicates at least one of PDCP entity re-establishment and PDCP data recovery of the first PDCP entity.

3. The method of claim 1, wherein the second PDCP entity is associated with at least one Acknowledgement mode (AM) Radio Link Control (RLC) entity.

4. The method of claim 3, wherein the second PDCP entity is associated with an Unacknowledged Mode (UM) RLC entity in addition to the at least one AM RLC entity.

5. The method of claim 1, wherein the first RRC reconfiguration message further indicates at least one of adding, releasing, and modifying the second PDCP entity.

6. The method of claim 1, wherein the first RRC reconfiguration message further indicates to the second PDCP entity to switch a transmission scheme of the MRB configuration from a Point to Point (PTP) transmission scheme to a Point to Multipoint (PTM) transmission scheme or from the PTM transmission scheme to the PTP transmission scheme.

7. A user equipment (UE) for triggering a packet data convergence protocol (PDCP) status report, the UE comprising:
at least one processor; and
at least one non-transitory computer-readable medium coupled to the at least one processor and storing one or more computer-executable instructions that, when executed by the at least one processor, cause the UE to:
receive, from a network, a Data Radio Bearer (DRB) configuration for configuring a DRB that is associated with a first PDCP entity of the UE;
receive, from the network, a Multicast Broadcast Service Radio Bearer (MRB) configuration for configuring an MRB that is associated with a second PDCP entity of the UE;
trigger, by the first PDCP entity, a first PDCP status report based on a first configuration of the first PDCP entity;
receive, from the network, an information element (IE) indicating that the second PDCP entity is configured to trigger a second PDCP status report; and
trigger, by the second PDCP entity, the second PDCP status report upon receiving, from the network, the IE and a first Radio Resource Control (RRC) reconfiguration message for a second configuration of the second PDCP entity, wherein:
the first RRC reconfiguration message is used for reconfiguring the second PDCP entity and indicates at least one of PDCP entity re-establishment and PDCP data recovery of the second PDCP entity.

8. The UE of claim 7, wherein:
the one or more computer-executable instructions, when executed by the at least one processor, further cause the UE to trigger the first PDCP status report when the UE receives, from the network, a second Radio Resource Control (RRC) reconfiguration message for the first configuration of the first PDCP entity, and
the second RRC reconfiguration message is used for reconfiguring the first PDCP entity, and indicates at least one of PDCP entity re-establishment and PDCP data recovery of the first PDCP entity.

9. The UE of claim 7, wherein the second PDCP entity is associated with at least one Acknowledgement mode (AM) Radio Link Control (RLC) entity.

10. The UE of claim 9, wherein the second PDCP entity is associated with an Unacknowledged Mode (UM) RLC entity in addition to the at least one AM RLC entity.

11. The UE of claim 7, wherein the first RRC reconfiguration message further indicates at least one of adding, releasing, and modifying the second PDCP entity.

12. The UE of claim 7, wherein the first RRC reconfiguration message further indicates to the second PDCP entity to switch a transmission scheme of the MRB configuration from a Point to Point (PTP) transmission scheme to a Point to Multipoint (PTM) transmission scheme or from the PTM transmission scheme to the PTP transmission scheme.

* * * * *